(12) United States Patent
Yano et al.

(10) Patent No.: US 6,249,487 B1
(45) Date of Patent: Jun. 19, 2001

(54) WRIST INSTRUMENT AND ELECTRONIC APPARATUS

(75) Inventors: Junro Yano; Naohiko Sakurazawa; Shunji Minami, all of Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/364,831

(22) Filed: Jul. 30, 1999

(30) Foreign Application Priority Data

Aug. 27, 1998 (JP) .................................................. 10-242138
Jun. 9, 1999 (JP) .................................................. 11-163114

(51) Int. Cl.⁷ .................................................. G04C 11/02
(52) U.S. Cl. .................................. 368/47; 368/10; 368/88
(58) Field of Search ............................ 368/47, 203, 204, 368/223, 281, 282, 227, 88, 300, 316, 317

(56) References Cited

U.S. PATENT DOCUMENTS

| | | | |
|---|---|---|---|
| 3,945,193 | * 3/1976 | Yasuda et al. | 58/23 BA |
| 4,095,408 | 6/1978 | Kashio | 58/23 R |
| 4,194,355 | * 3/1980 | Nishida | 368/282 |
| 4,419,770 | * 12/1983 | Yagi | 368/10 |
| 4,629,329 | * 12/1986 | Komiyama | 368/204 |
| 4,680,676 | * 7/1987 | Petratos et al. | 361/424 |
| 4,681,464 | 7/1987 | Ray | 368/157 |
| 4,783,772 | 11/1988 | Umemoto et al. | 368/11 |
| 5,346,401 | 9/1994 | Delianides et al. | 439/67 |
| 5,408,444 | 4/1995 | Kita et al. | 368/47 |
| 5,790,477 | * 8/1998 | Hauke | 368/47 |
| 5,872,744 | * 2/1999 | Taylor | 368/204 |
| 5,886,954 | * 3/1999 | Asami et al. | 368/227 |

FOREIGN PATENT DOCUMENTS

| | | |
|---|---|---|
| 579 798 | 9/1976 | (CH) . |
| 0 156 302 | 10/1985 | (EP) . |
| 0 616 384 | 9/1994 | (EP) . |
| 0 706231 | 4/1996 | (EP) . |
| 0 754 988A2 | 1/1997 | (EP) . |
| 2 505 105 | 11/1982 | (FR) . |
| 2 641 092 | 6/1990 | (FR) . |
| 2 201 266A | 8/1988 | (GB) . |

* cited by examiner

*Primary Examiner*—Bernard Roskoski
(74) *Attorney, Agent, or Firm*—Frishauf, Holtz, Goodman, Langer & Chick, P.C.

(57) ABSTRACT

An electronic apparatus is provided which enables miniaturization and has not only good electromagnetic shielding characteristics but also good resistance to impact. The electronic apparatus includes: an instrument case having an upper case and a case back, an electromagnetic shielding body which is contained in the instrument case, and electronic members, for example, an analog board, a digital board and the like, which are disposed in the shielding body. The body comprises a pair of half body members of shielding material. One of the pair is a first shielding member having a standing and surrounding periphery and an opening at an end. The other of the pair is a second shielding member having a standing and surrounding periphery and an opening at an end. The openings and of the first and second shielding members are opposed to each other so that they can be coupled with each other by fitting one of the standing and surrounding peripheries into the other thereof. An electromagnetic shielding partition member is disposed between a part, e.g., the analog board, of the electronic members and the other part, e.g., the digital board thereof. Outside one of the half body members, an antenna is provided.

18 Claims, 27 Drawing Sheets

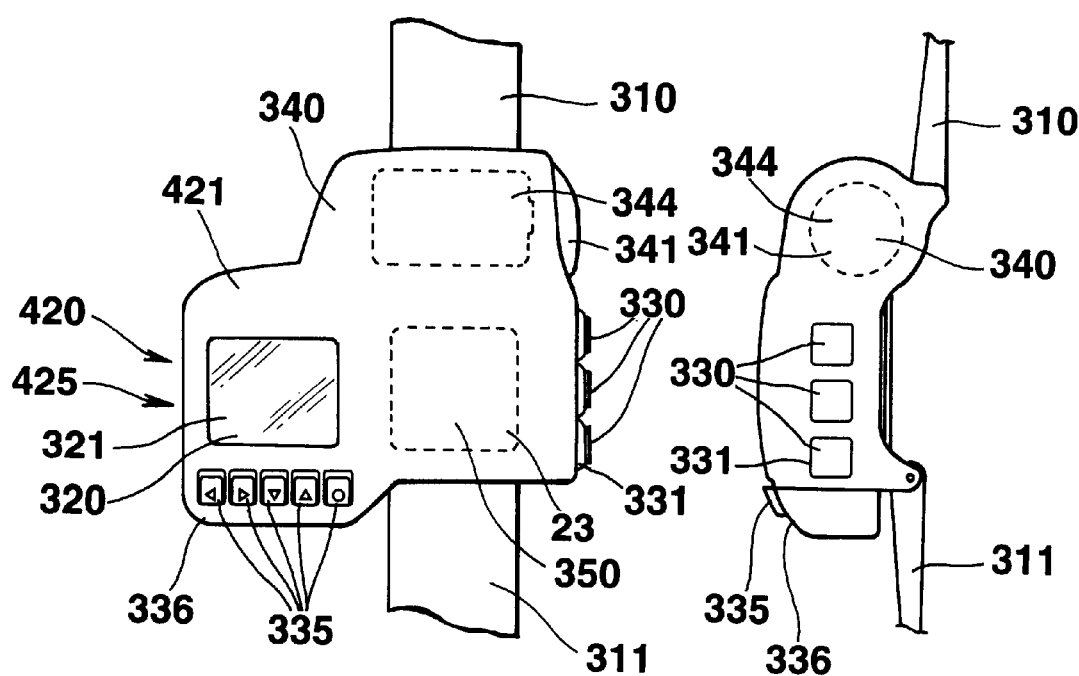
FIG.22A  FIG.22B

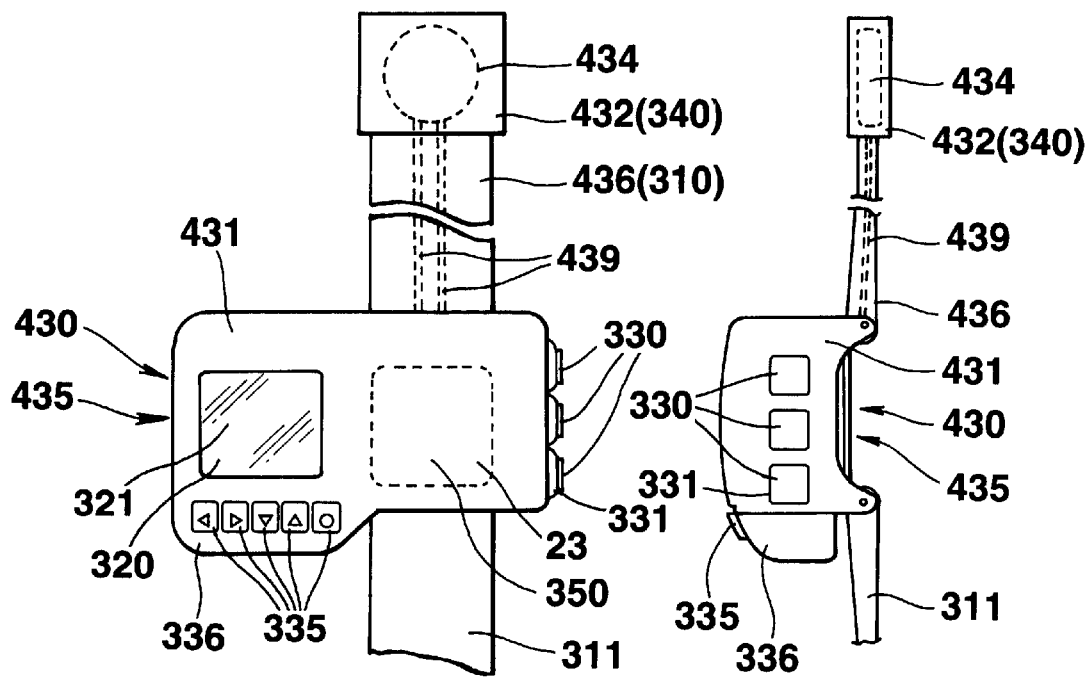
FIG.23A
FIG.23B
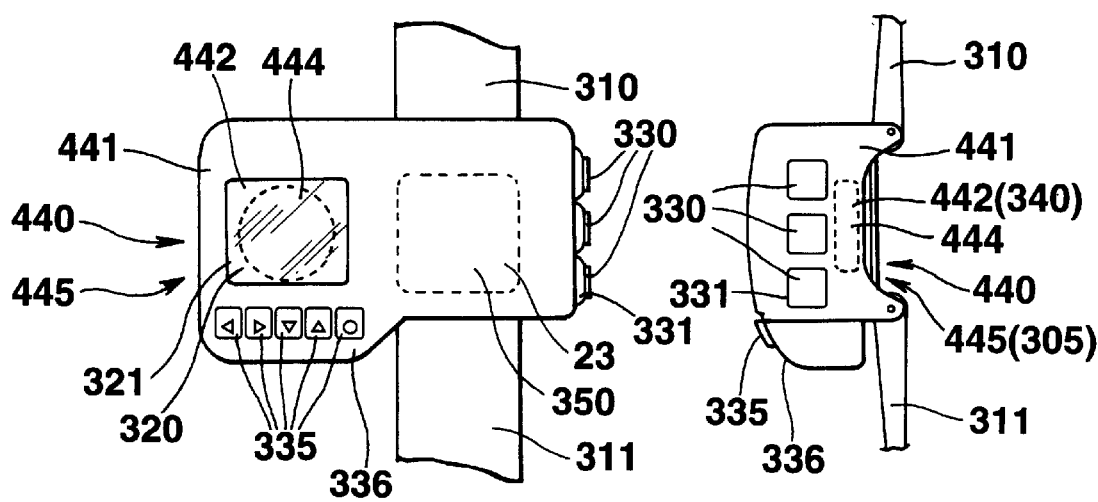
FIG.24A
FIG.24B

WRIST INSTRUMENT AND ELECTRONIC APPARATUS

BACKGROUND OF THE INVENTION

Field of the Invention

The present invention relates to a wrist instrument and an electronic apparatus, which are useful for application to a portable terminal such as an electronic watch, an electronic pocket notebook, and the like.

Recently, various types of portable electronic apparatuses each having a GPS receiver, a position detecting system and the like are proposed.

In order to provide a GPS receiver, a position detecting system and the like in a very small sized portable electronic apparatus, an arrangement wherein a receiving antenna and a receiving circuit section are very close together, and an analog board and a digital board in the receiving circuit section are also very close together, is required.

However, the digital board tends to be a generation source of high-frequency digital noise, and the receiving antenna and the analog board are easily influenced by the noise. Therefore, electromagnetic shielding is required between the receiving antenna and the digital board and between the analog board and the digital board.

According to a manner to attach a circuit board (analog board) in a prior electronic apparatus, there was a possibility of a break of a boss thereof when a shock was given to the electronic apparatus.

SUMMARY OF THE INVENTION

An object of the invention is to provide an electronic apparatus which enables miniaturization and has not only good electromagnetic shielding characteristics but also good resistance to impact.

Another object of the invention is to provide a wrist instrument having various functional sections which are arranged in a limited space compactly.

BRIEF DESCRIPTION OF THE DRAWINGS

FIGS. 18A and 18B are vertical sectional views of FIG. 17, wherein FIG. 18A shows the state before thermo-compressing the heat seal to the circuit board and FIG. 18B shows the state after thermo-compressing;

FIG. 22A is a plan view of the GPS watch according to a third example of a second embodiment of the invention, and FIG. 22B is a side view thereof;

FIG. 23A is a plan view of the GPS watch according to a fourth example of a second embodiment of the invention, and FIG. 23B is a side view thereof;

FIG. 24A is a plan view of the GPS watch according to a fifth example of a second embodiment of the invention, and FIG. 24B is a side view thereof;

PREFERRED EMBODIMENT OF THE INVENTION

First Embodiment:

A first embodiment of the invention will be explained with reference to FIGS. 1–18.

Figure 1:
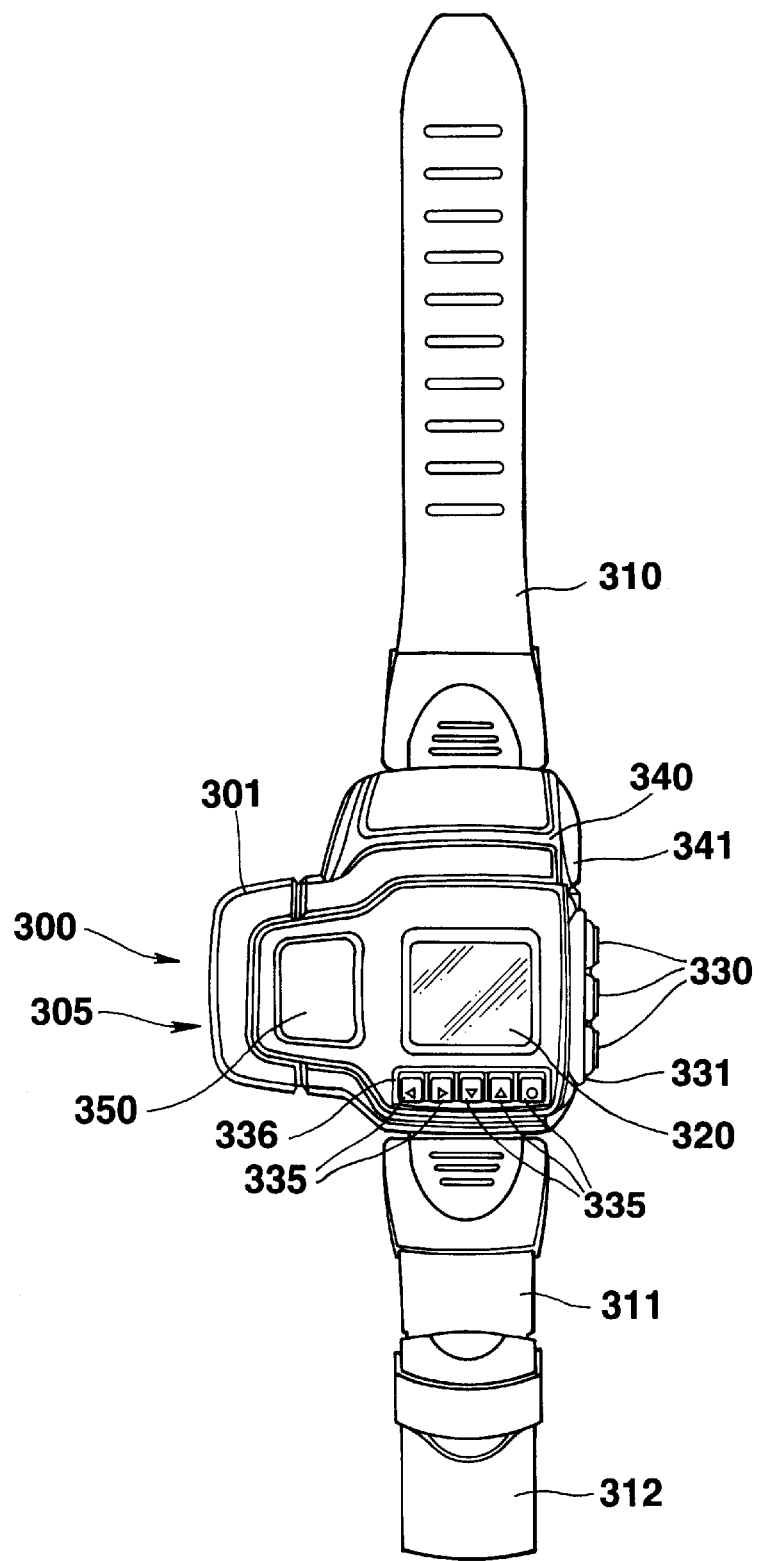
FIG. 1 is a plan view of a GPS watch, for a wrist instrument or an electronic apparatus, according to a first embodiment of the present invention.
Figure 2:
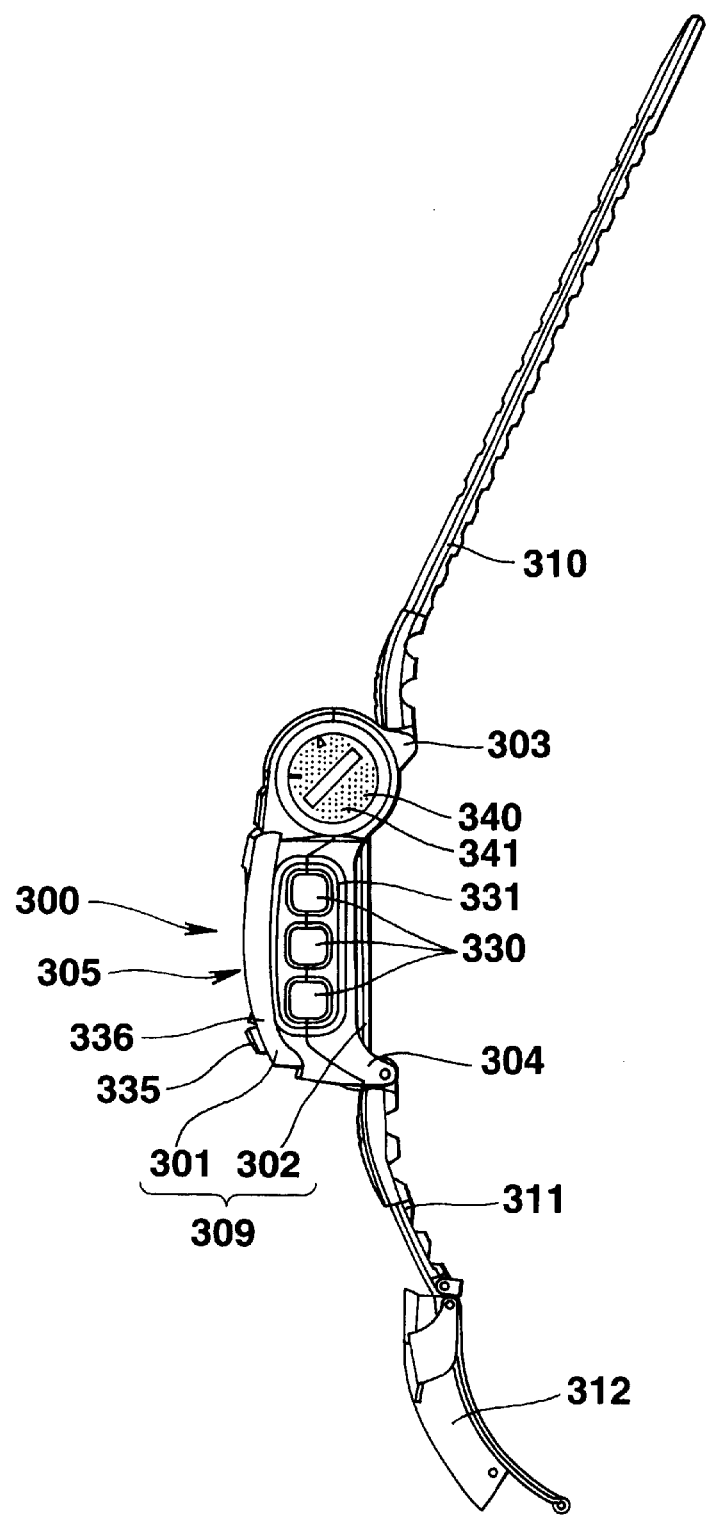
FIG. 2 is a right side view of the GPS watch in FIG. 1.
Figure 3:
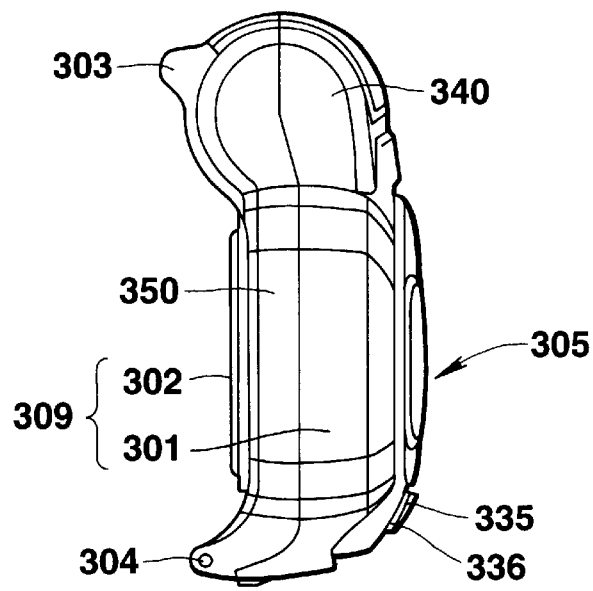
FIG. 3 is a left side view of the body of the GPS watch in FIG. 1.
Figure 4:
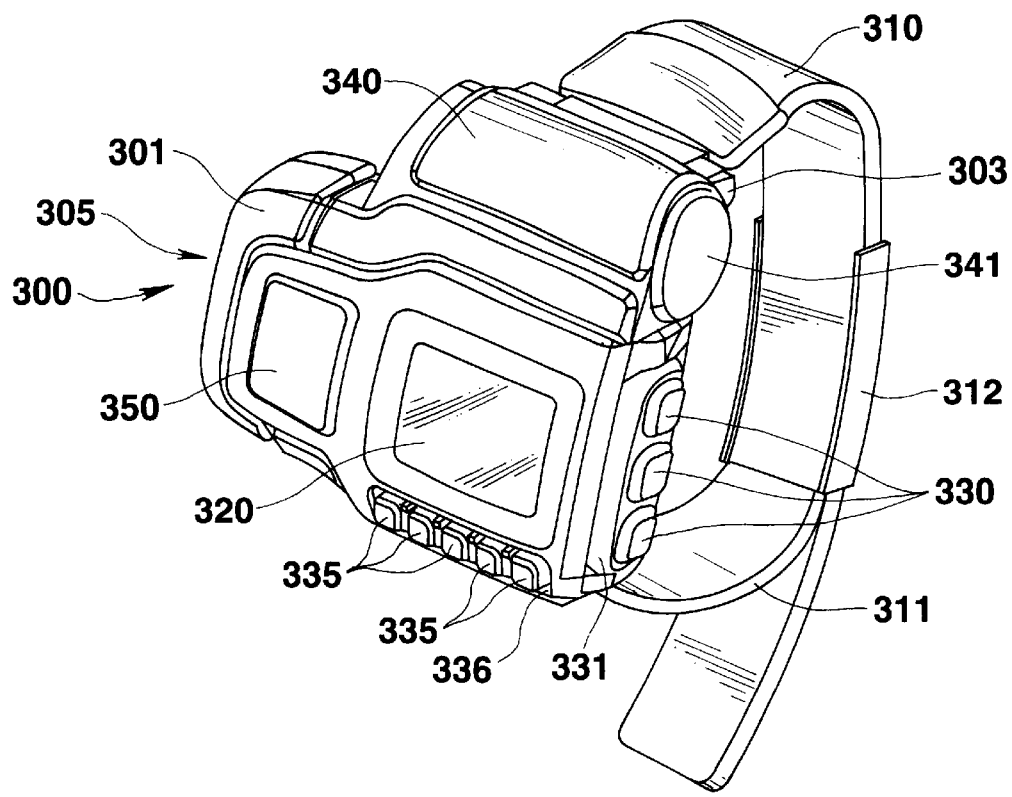
FIG. 4 is a perspective view of the GPS watch in a state in which the band members are coupled with each other by using a buckle.
Figure 5:
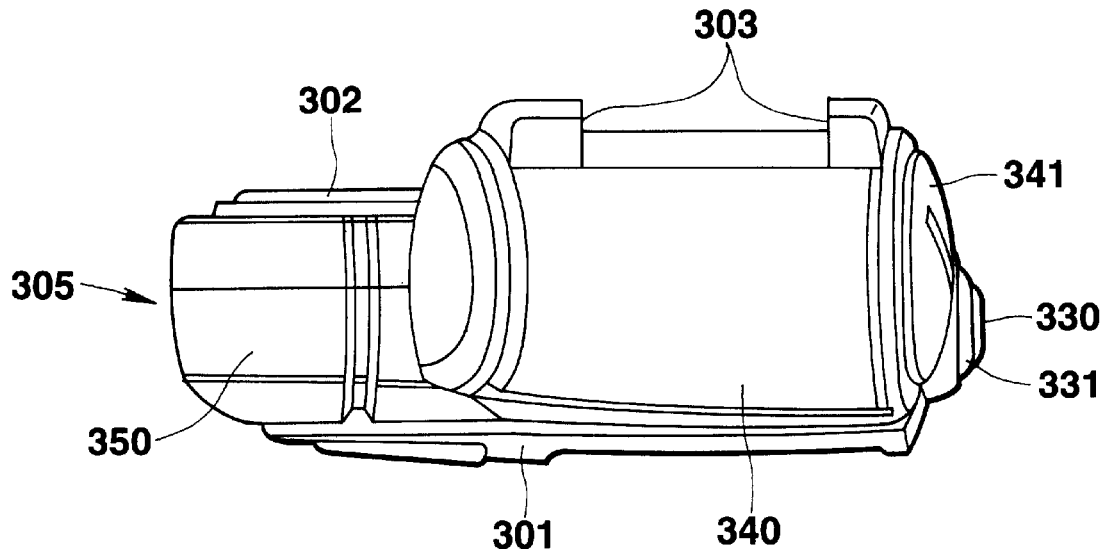
FIG. 5 is a back view of the GPS watch.
Figure 6:
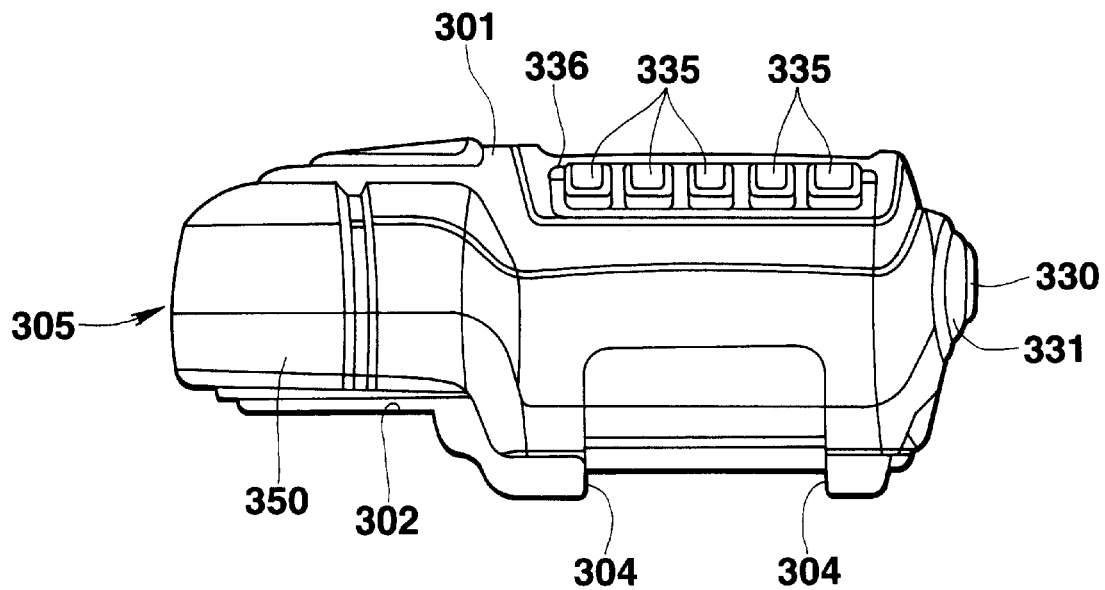
FIG. 6 is a front view of the GPS watch.
Figure 7:
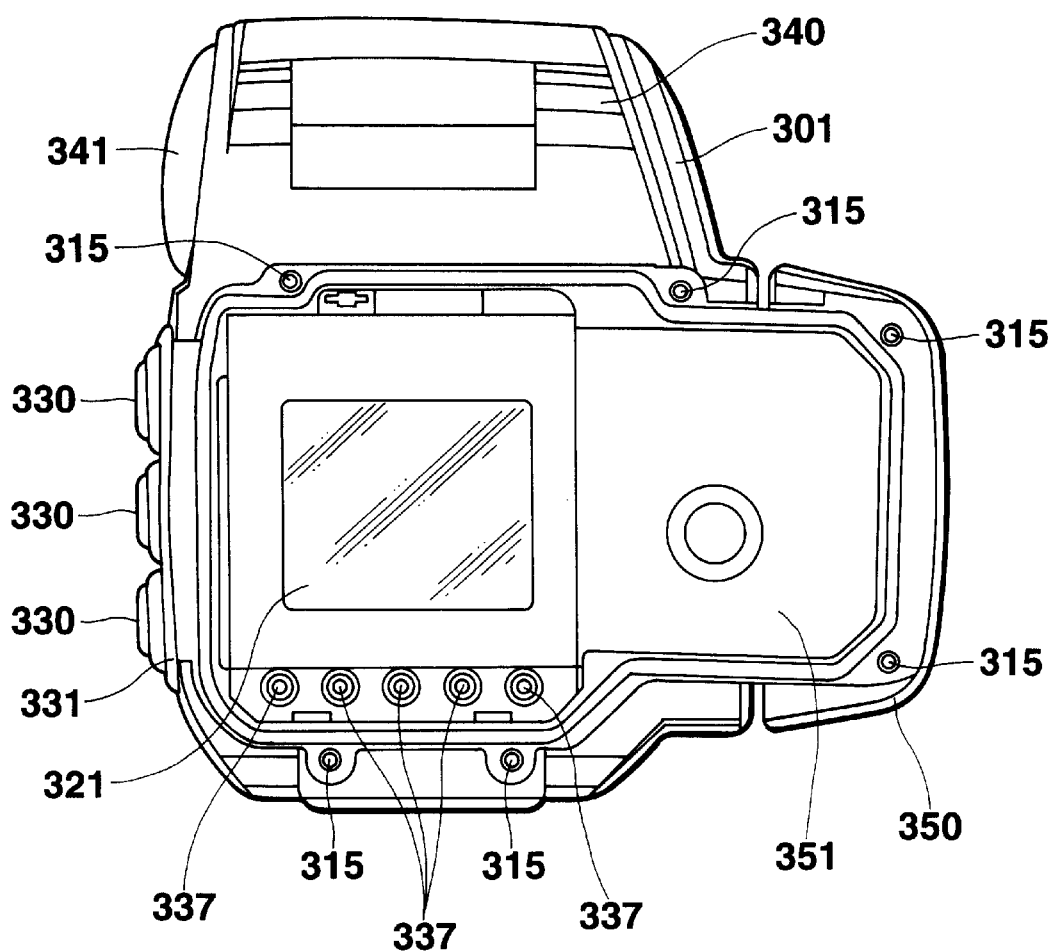
FIG. 7 is a bottom view of the apparatus case of the GPS watch.
Figure 8:
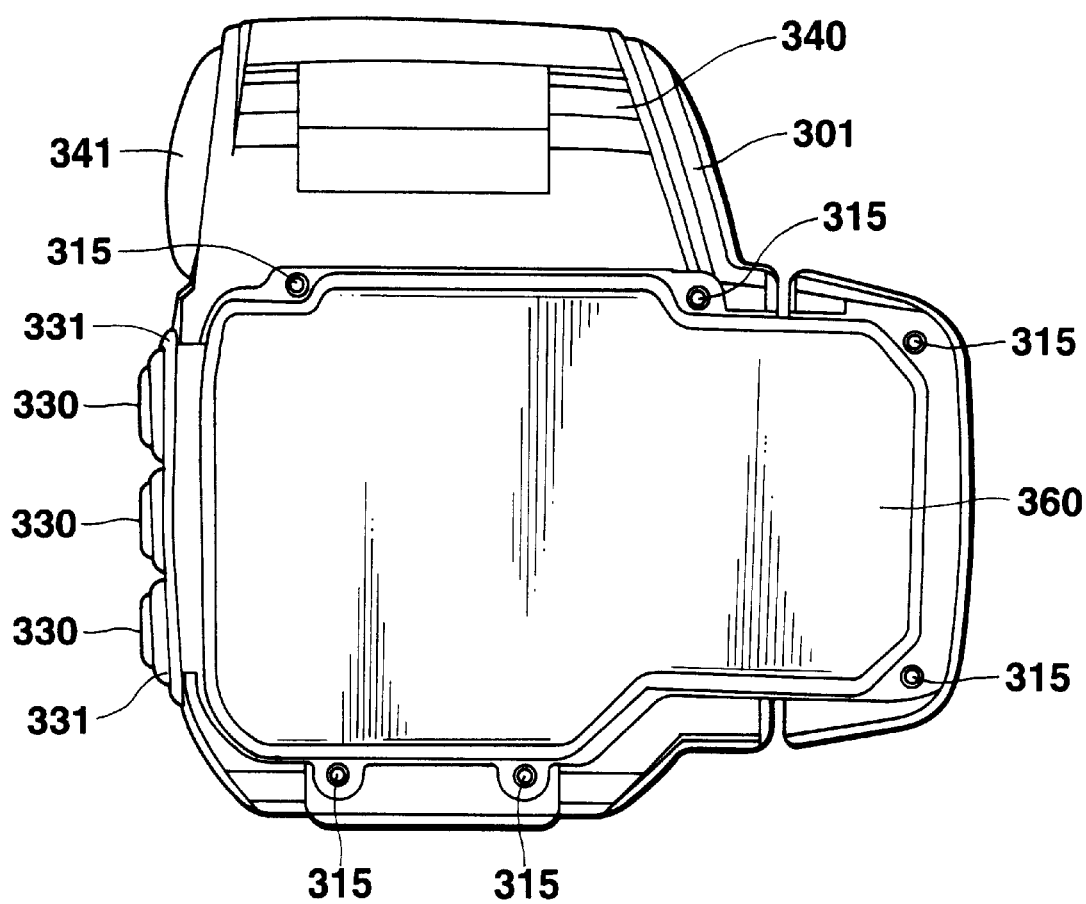
FIG. 8 is a bottom view of the apparatus case of the GPS watch, in which an inner apparatus and the like are contained.
Figure 9:
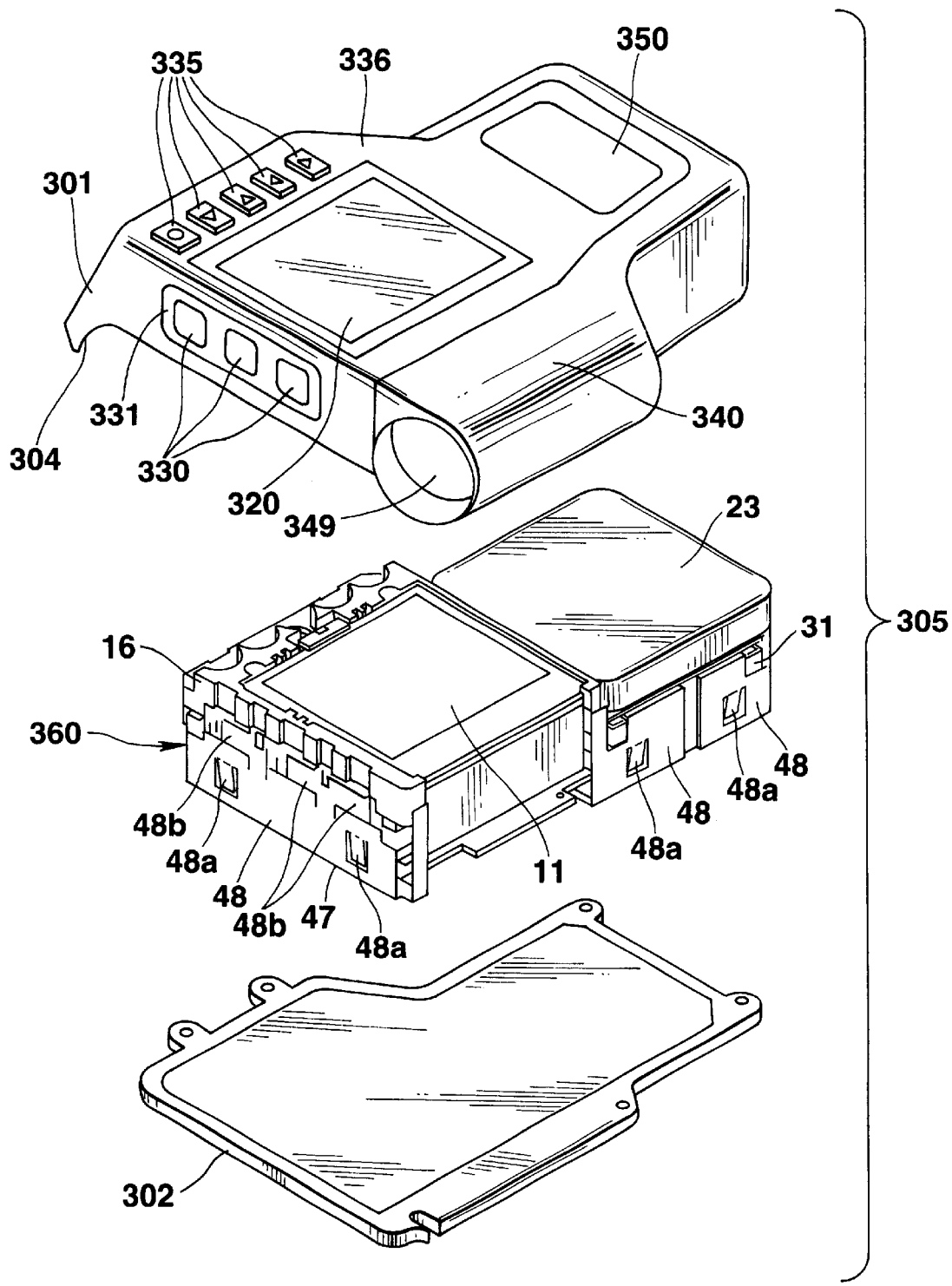
FIG. 9 is a disassembled perspective view of the GPS watch.
Figure 10:
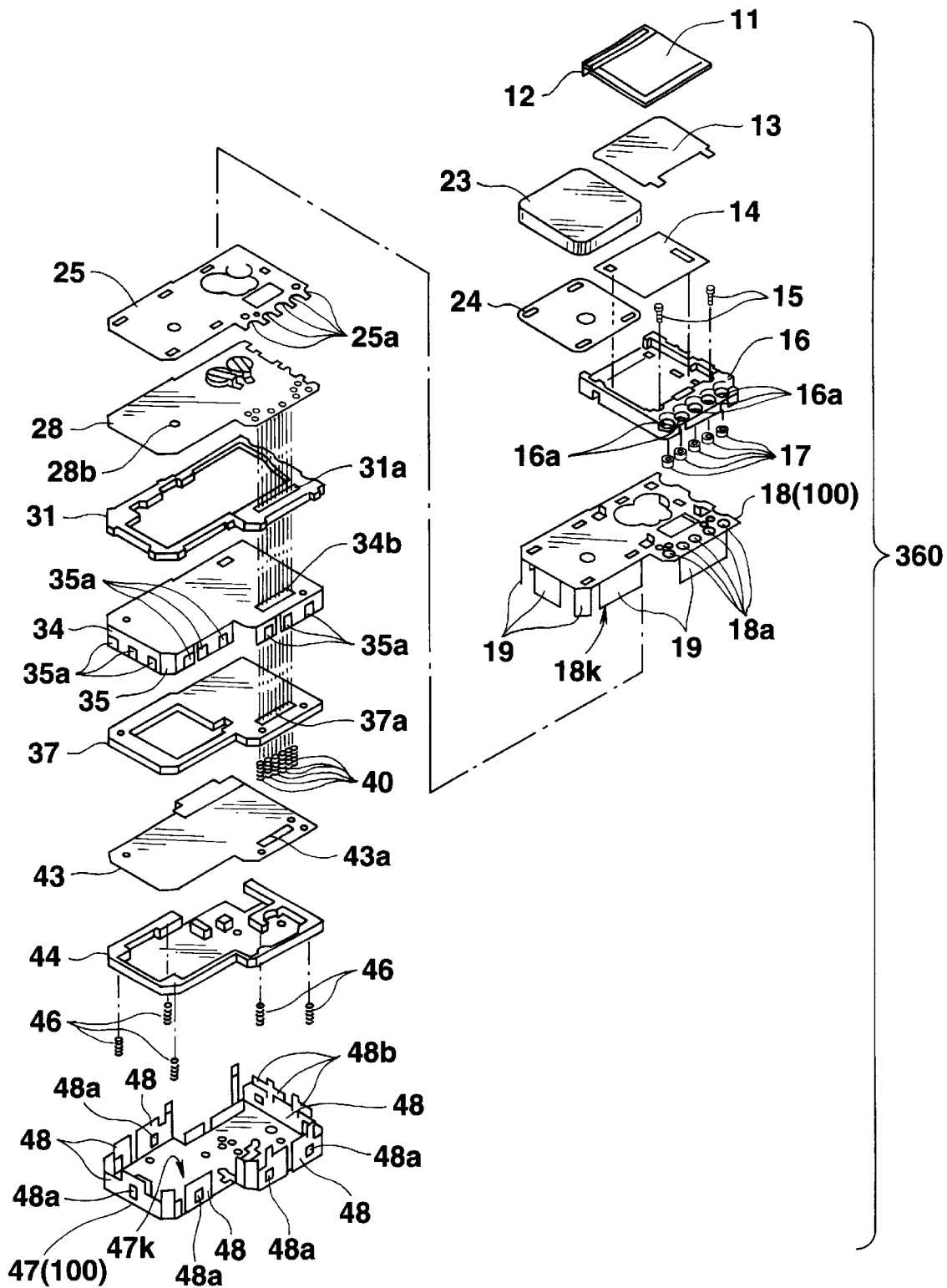
FIG. 10 is a disassembled perspective view of the inner apparatus and the like, of the GPS watch.
Figure 11:
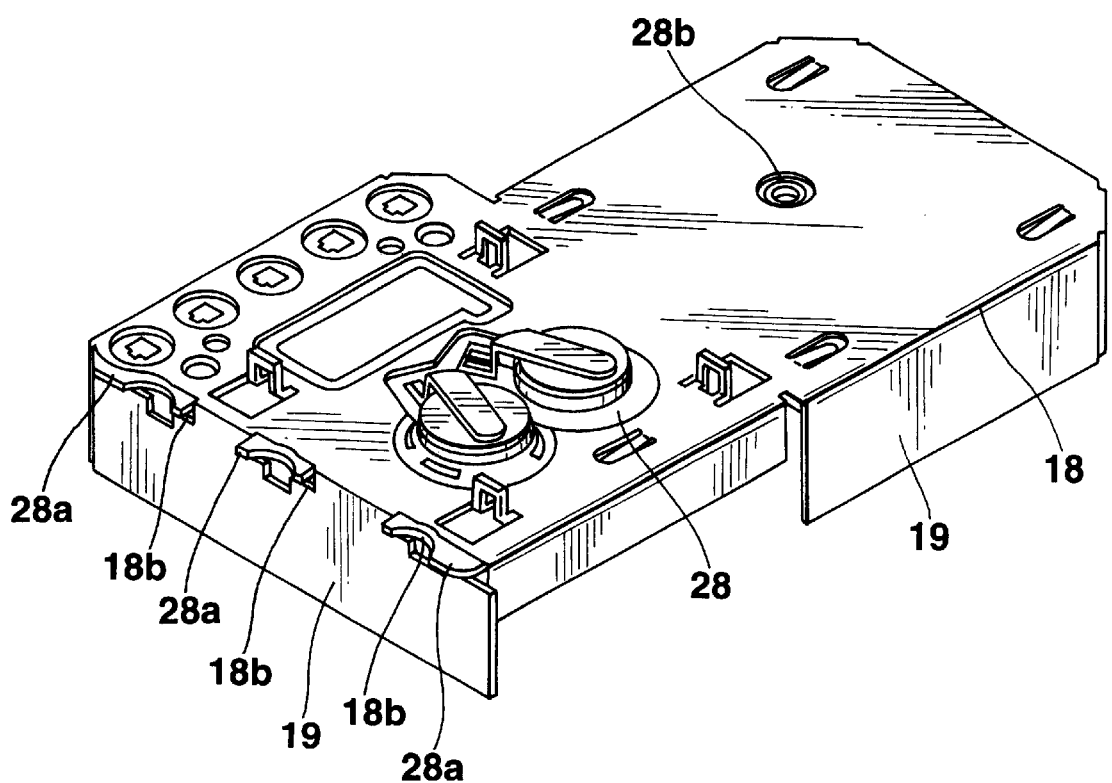
FIG. 11 is a perspective view of the shielding body to which the analog board and the like are assembled.

FIG. 1 is a plan view of a GPS watch 300, as a wrist instrument or an electronic apparatus, according to a first embodiment of the present invention; FIG. 2 is a right side view of the GPS watch 300 in FIG. 1; FIG. 3 is a left side view of the instrument body 305 of the GPS watch 300 in FIG. 1; FIG. 4 is a perspective view of the GPS watch 300 in a state of in which the band members 310 and 311 are coupled with each other by using a buckle 312; FIG. 5 is a back view, i.e., a view from opposite side to the user, of the GPS watch 300; FIG. 6 is a front view, i.e., a view from this side of the user, of the GPS watch 300; FIG. 7 is a bottom view of the upper case 301 of the GPS watch 300; and FIG. 8 is a bottom view of the upper case 301 of the GPS watch 300, in which inner devices and the like 360 are contained. FIG. 9 is a disassembled perspective view of the GPS watch 300; FIG. 10 is a disassembled perspective view of the inner devices and the like 360, of the GPS watch 300; and FIG. 11 is a perspective view of the shielding body 18 to which the analog board 28 and the like are assembled.

Figure 12:
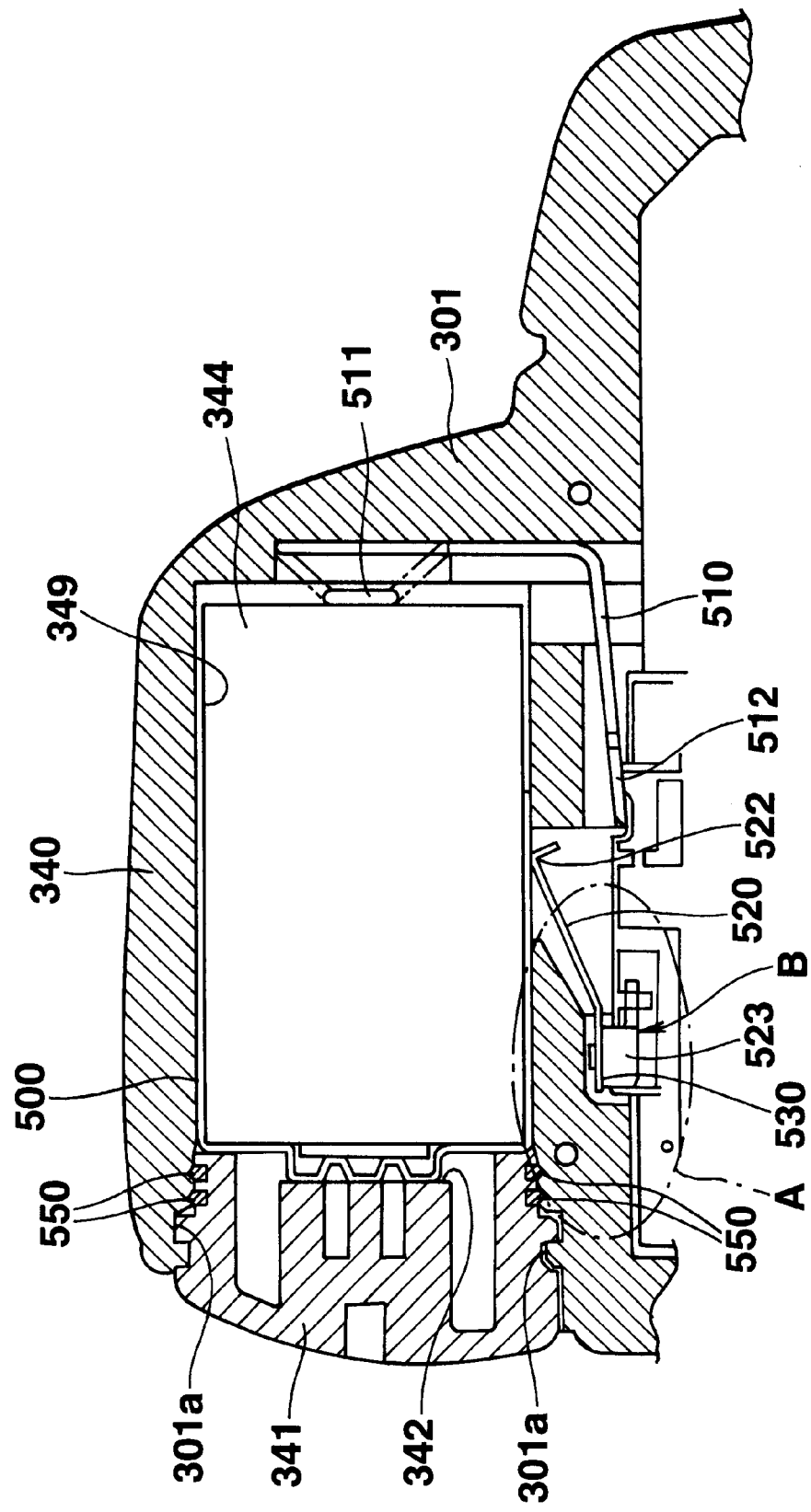
FIG. 12 is a longitudinal and vertical sectional view of the battery containing section.
Figure 13:
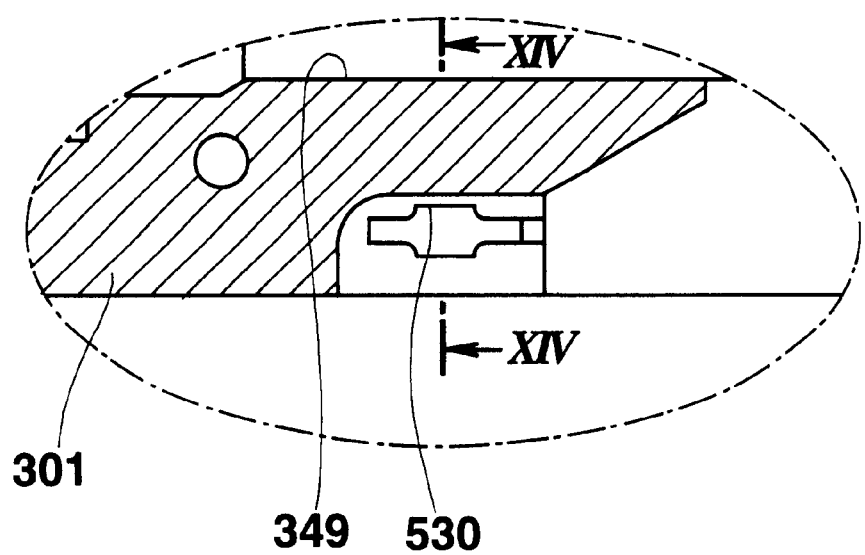
FIG. 13 is a enlarged sectional view of the portion "A" in FIG. 12.
Figure 14:
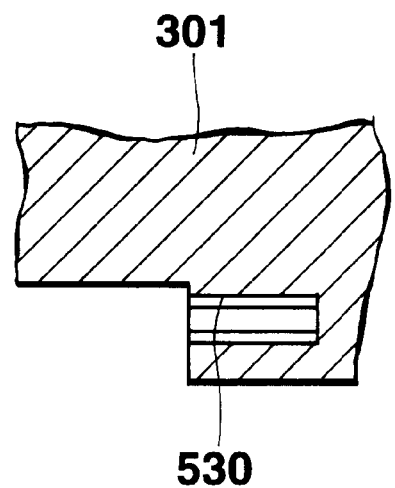
FIG. 14 is a sectional view taken along the line II-II in FIG. 13.
Figure 15:
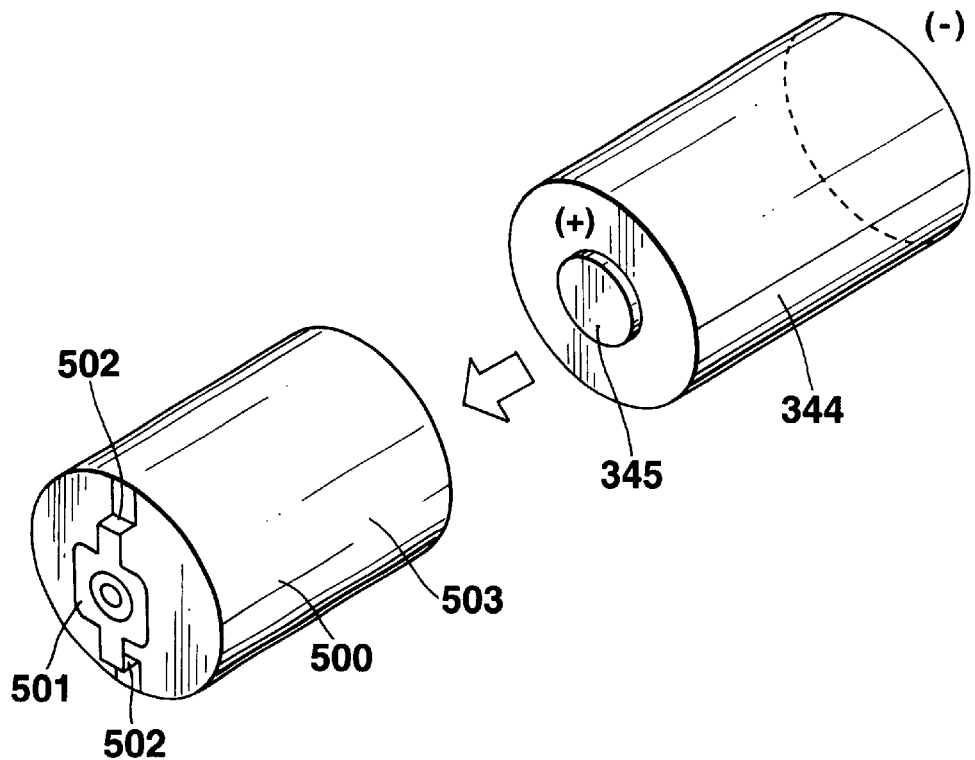
FIG. 15 is a perspective view of the battery and the conductive member for covering the battery.
Figure 16:
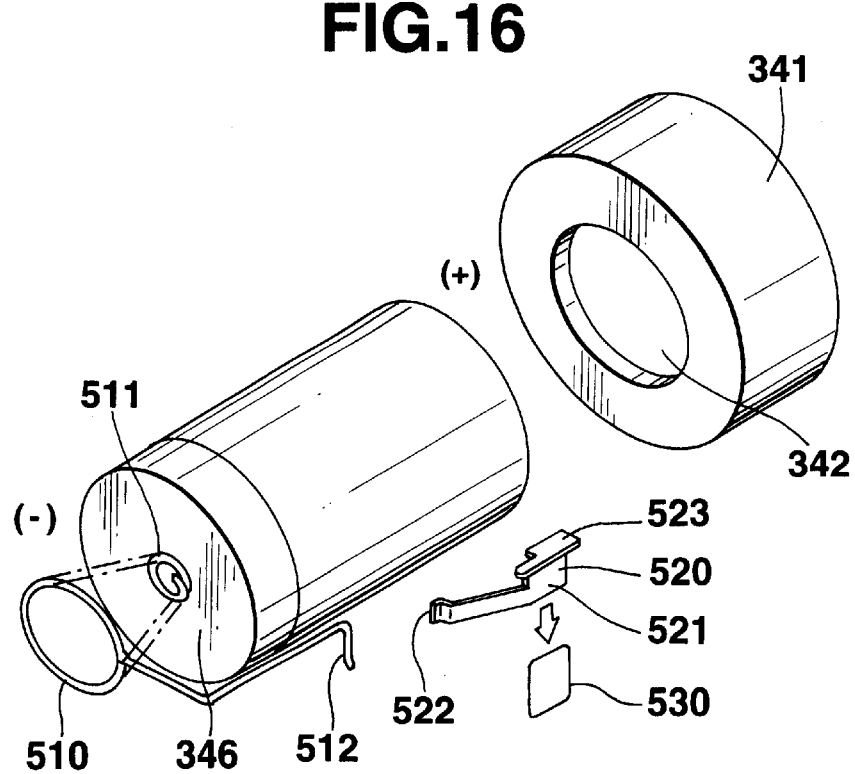
FIG. 16 is a perspective view showing the battery covered by the conductive member, the cover, the electrode member, the insertion portion of the electrode member, and the conductive member.

FIG. 12 is a longitudinal and vertical sectional view of the battery containing section 340; FIG. 13 is a enlarged sectional view of the portion "A" in FIG. 12; FIG. 14 is a sectional view taken along the line II—II in FIG. 13; FIG. 15 is a perspective view of the battery 344 and the conductive member 500 for covering the battery 344; and FIG. 16 is a perspective view showing the battery 344 covered by the conductive member 500, the cover (covering member) 341, the electrode member 520, the insertion portion 530 of the electrode member 520, and the conductive member 510.

Figure 17:
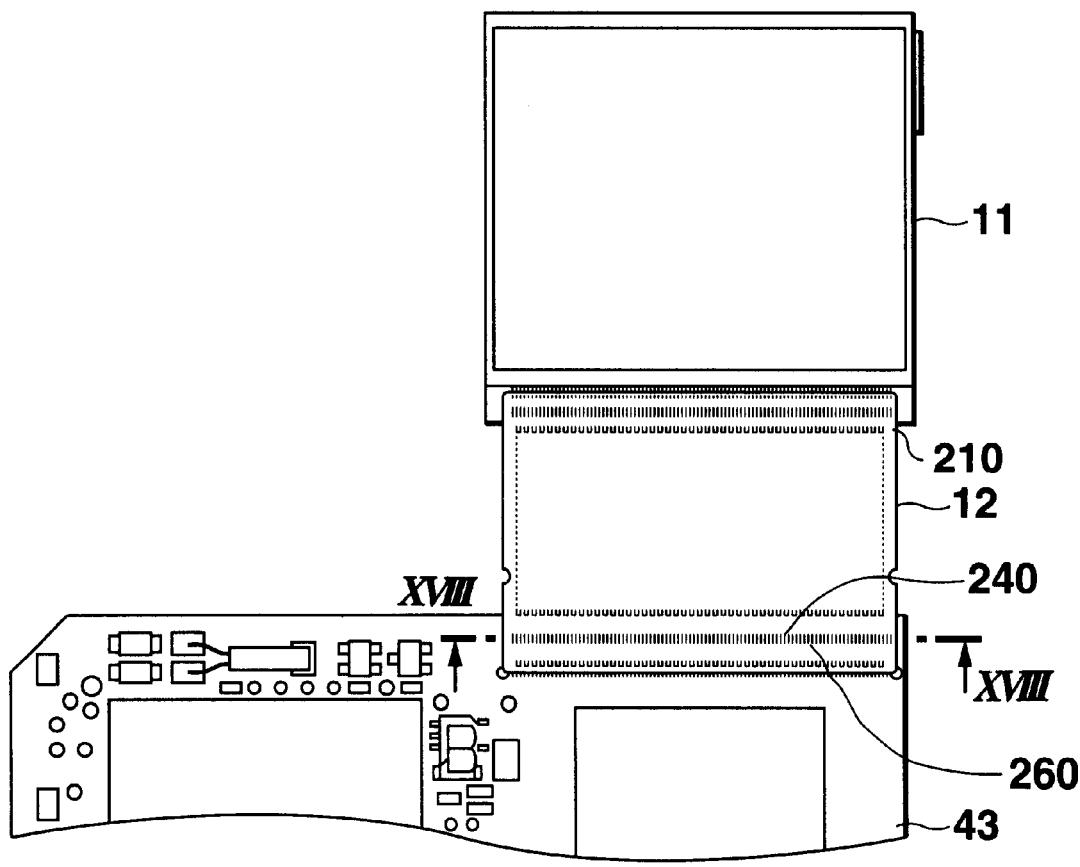
FIG. 17 is a plan view of the LCD and the circuit board, which are electrically connected through the heat seal.
Figure 18A:
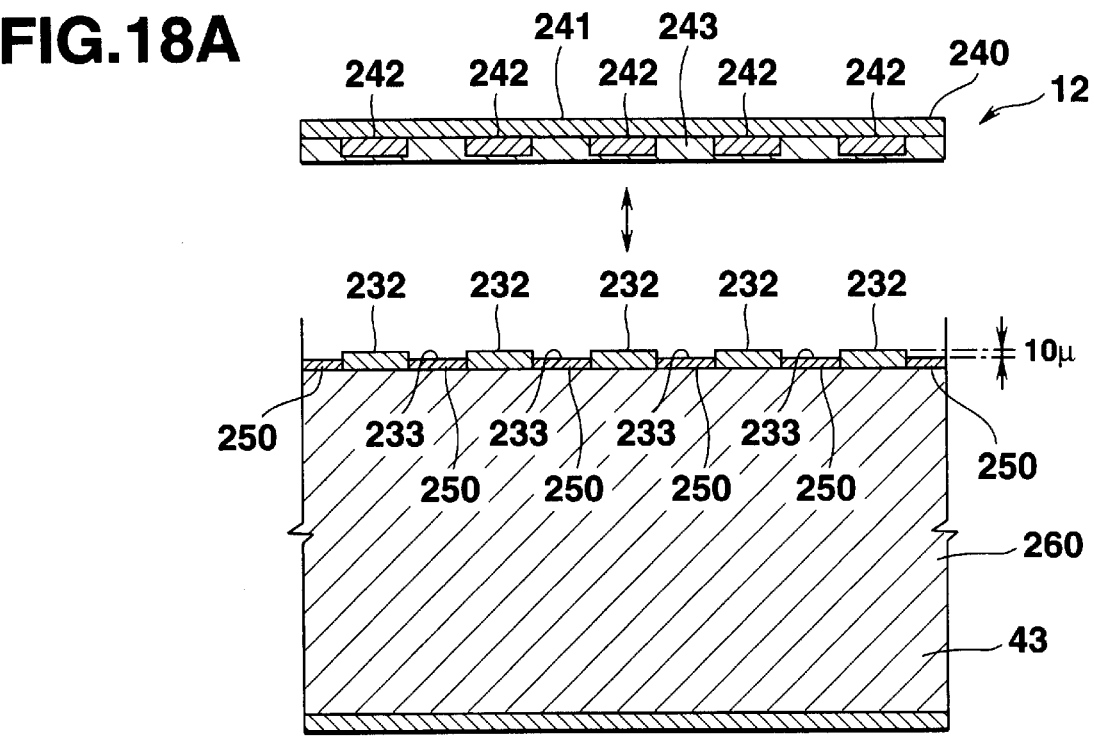
Figure 18B:
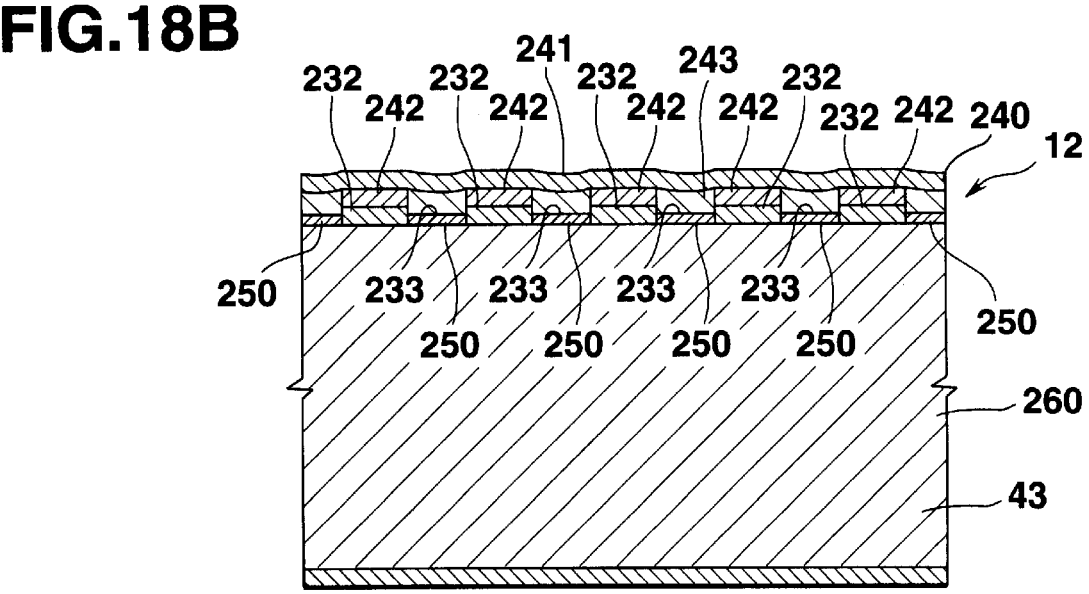

FIG. 17 is a plan view of the LCD (Liquid Crystal Display device) 11 and the digital board (circuit board) 43, which are electrically connected through the heat seal 12; and FIGS. 18A and 18B are vertical sectional views of FIG. 17, wherein FIG. 18A shows the state before thermo-compressing the heat seal 12 to the circuit board 43 and FIG. 18B shows the state after thermo-compressing.

The GPS watch 300 according to the first embodiment of the present invention comprises: the instrument body 305 which is held by the band members 310 and 311; a display section 320 which is disposed at a position easy to see on a front side of the instrument body 305; an operational section 336 which is disposed at a position on a bottom side, of the instrument body 305; a battery containing section 340 which is disposed at a position at an opposite side to the operational section 336; and an antenna section (data receiving section) 350 which is disposed at a position near the display section 320.

As shown in FIGS. 1–6, the GPS watch 300 comprises: an instrument case 309 comprising the upper case 301 and a case back 302; a pair of band members 310 and 311 which are attached to the peripheral portions opposite to each other, of the instrument case 309, for wearing the GPS watch 300 around a wrist of the user; the display section 320 which is disposed in the front side of the instrument case 309, for displaying the data generated by processing signals through a receiving circuit, to enable seeing it through a display window 321; operational sections 331 and 336 which are disposed at the peripheral portion of the instrument case 309, for operating the GPS watch 300; the antenna section 350 containing a receiving antenna 23 therein which is also in the instrument case 309; and the battery containing section 340 for containing a cylindrical battery 344 as a power source.

The rest portion of the GPS watch 300 excepting the band members 310 and 311 constitutes the body (instrument body) 305 of the GPS watch 300.

As shown in FIG. 7, in the rear surface of the lower end portion of the upper case 301, a plurality of female screws 315 for screwing the case back 302 to the upper case 301 are formed. At the just back portion of the operational section 336, contacts 337 are disposed. When any one of switch buttons 335 which will be explained later is push-operated or operation-released, the corresponding one of the contacts 337 is moved or returned to come into contact with or separate from the contacts of the inner devices and the like 360 which will be explained later in detail, respectively. At the back portion of the operational section 331, three contacts are disposed, although these are not shown in the figures. When any one of switch buttons 330 which will be explained later is push-operated or operation-released, the corresponding one of three contacts is moved or returned to come into contact with or separate from the contacts of the inner devices and the like 360, respectively. After the inner devices and the like 360 are arranged in such an upper case 301, the case back 302 is placed on the back side of the upper case 301, as shown in FIG. 8. Thereafter, the case back 302 is screwed to the upper case 301 through screws which are not shown, so that the inner devices and the like 360 are contained in the instrument case 309. Thus, the back three contacts for the switch buttons 330 and the back contacts 337 for the switch buttons 335 face to the contacts in the side of the inner devices and the like 360. Therefore, when pushing any one of the switch buttons 330 and the switch buttons 335, a corresponding contact among the back three contacts and the back contacts 337 is brought into contact with the contacts in the side of the inner devices and the like 360, so that various types of operations, e.g., display change for the display section 320, is carried out.

The band member 310 is attached to a band attachment 303 which is formed at a top side of the upper case 301. On the other hand, the band member 311 having a buckle 312 for coupling with the band member 310 is attached to a band attachment 304 which is formed at a bottom side of the upper case 301. When the GPS watch 300 is worn on a wrist of the user by coupling the band members 310 and 311 with each other by means of the buckle 312 and is brought in front of the user in a state of the display section 320 facing upward, the user can see the information displayed on the display section 320 easily.

The display section 320 is arranged on the upper case 301 between the band attachments 303 and 304.

The instrument case 309 has an expanded portion which expands to left from the display section 320. The expanded portion comprises the antenna section 350 containing a GPS receiving antenna 23 inside.

The operational section 331 is provided with a plurality of, for example, three, switch buttons 330 on the right side surface of the upper case 301, that is, arranged in the right side of the display section 320. The operational section 336 is provided with a plurality of, for example, five, switch buttons 335 on the front surface of the upper case 301, that is, arranged in this side of the display section 320.

The battery containing section 340 is arranged in the side opposite to the operational section 336 with respect to the display section 320, of the instrument case 309. In the battery containing section 340, a battery 344 is contained and a cover 341 prevents the battery 344 from slipping out thereof. The battery containing section 340 will be explained later in detail.

As described above, the antenna section 350 is arranged in the left side of the display section 320, the operational section 331 is arranged on the right peripheral portion (right side surface) of the instrument case 309, and the operational section 336 is arranged at the bottom side of the display section 320. Therefore, when the GPS watch 300 is worn on a left wrist of the user and the operational sections 331 and 336 are operated by the right hand, it is possible to prevent the GPS receiving antenna 23 from shielding by the right hand and to prevent the display of the display section 320 from shielding by the hand.

Because the antenna section 350 is arranged in the left side of the display section 320, and the pair of band members 310 and 311 are attached to the band attachments 303 and 304 of the instrument case 309, to sandwich the display section 320, and the antenna section 350 is arranged in the left side of the display section 320. Therefore, when wearing the GPS watch 300 around the left arm by using the pair of band members 310 and 311, the antenna section 350 containing the GPS receiving antenna 23 is not positioned in the top end side of the left hand. Accordingly, the expanded antenna section 350 does not touch to the back of hand even if bending the left wrist upward.

When the antenna section 350 containing the GPS receiving antenna 23 and the display section 320 are arranged side by side, i.e., in a direction perpendicular to the band extending direction, the battery containing section 340 is arranged in the other side with respect to the GPS receiving antenna 23 and the display section 320 in the embodiment, at a position sandwiched between the display section 320 and the band member 310 in the instrument case 309. Because the arrangement space for the battery containing section 340 is not interfered with by the arrangement space for the antenna section 350 containing the GPS receiving antenna 23 and the display section 320, it is possible to use a battery having a large size and a large capacity.

As shown in FIG. 2, the battery containing section 340 is arranged at a position a little lower than the rest of the instrument case 309 and the band attachment portions 303 and 304 are formed at lower position of the instrument case 309 so that the whole instrument case 309 has an arch-shaped vertical section in the band extending direction. Accordingly, the GPS watch 300 tends to fit a wrist when wearing the GPS watch 300 on the wrist by using the pair of band members 310 and 311.

Although the battery containing section 340 containing a cylindrical battery 344 having a large capacity comes to be relatively large in size, it is possible to fit the GPS watch 300 on the wrist and to contain the battery containing section 340 in the instrument case 309.

As shown in FIG. 9, the inner devices and the like 360, of the GPS watch 300 are disposed between the upper case 301 (instrument case) and the case back 302 (instrument case). The inner devices and the like 360 comprises: an inner parts arranged inside the body 100 for electromagnetic shielding, and an outer parts arranged outside (in the upper side of) the body 100 for electromagnetic shielding, as shown in FIG. 10.

The body 100 for electromagnetic shielding, comprises a pair of half body members of shielding material. One of the pair is a first shielding member 18 having a standing and surrounding periphery 19 and an opening 18k at an end. The other of the pair is a second shielding member 47 having a standing and surrounding periphery 48 and an opening 47k at an end. The openings 18k and 47k of the first and second shielding members 18 and 47 are opposed to each other so that they can be coupled with each other by fitting one of the standing and surrounding peripheries 19 and 48 into the other thereof, as shown in FIG. 10. The inside and the outside of the body are electromagnetically shielded mutually by the electromagnetic body 100.

Inside the electromagnetic shielding body 100, an electromagnetic shielding partition member 34 is disposed to partition the interior of the body 100 into upper and lower parts, which are electromagnetically shielded mutually.

In the upper part of the body 100 partitioned by the shielding partition member 34, an analog board (including electronic members) 28 and the like are disposed, and in the lower part of the body 100, a digital board (including electronic members) 43 and the like are disposed. The analog board 28 and the digital board 43 have functions to process a signal received through the GPS receiving antenna 23 which will be explained later.

The analog board 28 tends to be influenced by electromagnetic noise. On the other hand, the digital board 43 tends to be a generation source of high-frequency digital noise. However, because the analog board 28 and the digital board 43 are electromagnetically shielded mutually by the shielding partition member 34, the analog board 28 is not influenced by the digital board 43.

Because both the analog board 28 and the digital board 43 are disposed inside the electromagnetic shielding body 100, they are not influenced by electromagnetic noise from the outside of the shielding body 100.

On the upper outer surface of the body 100, that is, on the upper outer surface of the first shielding member 18, the GPS receiving antenna 23 for receiving signals from a GPS satellite is fixed by a pressure sensitive adhesive double coated conductive tape 24. A feed pin 23a which is provided on a lower portion of the GPS receiving antenna 23 is fitted into a feeding point 28b of the analog board 28 and is fixed by soldering. As a result, the analog board 28 has the same electric potential as the GPS receiving antenna 23. Because the GPS receiving antenna 23 is outside the body 100 and the digital board 43 is inside the body 100, the GPS receiving antenna 23 which tends to be influenced by electromagnetic noise is not influenced by the digital board 43 which is a generation source of high-frequency digital noise.

On the upper outer surface of the first shielding member 18, an LCD (liquid crystal display) device 11 and the like are provided.

On the LCD device 11, information about the present position which is created by processing the signals received through the GPS receiving antenna 23 by the analog board 28 and the digital board 43, time information, and other information are displayed.

Components of the inner devices and the like 360 of the GPS watch 300 are assembled in the following manner.

After a plurality of coil springs 46 are set at predetermined positions on the bottom of the second shielding members 47, a housing 44 is placed on the bottom of the second shielding members 47. On the upper surface of the housing 44, the digital board 43 is placed, and coil springs 40 are set in a hole 43a formed in the digital board 43. Thereafter, a housing 37 is placed on the upper surface of the digital board 43, so that the housings 37 and 44 sandwich the digital board 43 and contain it therein. The shielding partition member 34 is placed on the housing 37 so that the coil springs 40 pass through a hole 34b formed in the shielding partition member 34. As described above, in the lower part of the body 100, that is, in the portion sandwiched between the shielding partition member 34 and the second shielding members 47, the digital board 43 is disposed through the housings 37 and 44.

The housing 31 is placed on the upper surface of the shielding partition member 34 so that the coil springs 40 pass through a hole 31a formed in the housing 31, and on the upper surface of the housing 31, the analog board 28 is placed. Further, an insulating sheet 25 is placed on the upper surface of the analog board 28. From the state, the standing and surrounding periphery 19 of the first shielding member 18 is inserted in the standing and surrounding periphery 48 of the second shielding member 47, to combine the first shielding member 18 with the second shielding member 47. As described above, in the upper part of the body 100, that is, in the portion sandwiched between the first shielding member 18 and the shielding partition member 34, the analog board 28 is disposed through the housing 31 and the insulating sheet 25.

The first shielding member 18, the shielding partition member 34 and the second shielding member 47 are made of conductive material, e.g., metal. In the standing and surrounding periphery 35 of the shielding partition member 34, notches are formed. In each of the notches, a contact 35a which can elastically deform, for enabling contact with the first shielding member 18 is provided. Each contact 35a which is folded outwardly is brought into contact with the first shielding member 18, so that the first shielding member 18 has the same electric potential as the shielding partition member 34.

Similarly, in the standing and surrounding periphery 48 of the shielding partition member 47, notches are formed. In each of the notches, a contact 48a which can elastically deform, for enabling contact with the first shielding member 18 is provided. Each contact 48a which is folded inwardly is brought into contact with the first shielding member 18, so that the first shielding member 18 has the same electric potential as the shielding partition member 47, as well as the shielding partition member 34.

Therefore, the digital board 43 is surrounded in almost all directions by the shielding partition member 47 and the shielding partition member 34, and thereby it is electromagnetically shielded from outside. The analog board 28 is surrounded in almost all directions by the first shielding member 18 and the shielding partition member 34, and thereby it is electromagnetically shielded from outside. Further, by the shielding partition member 34 which is disposed between the digital board 43 and the analog board 28, the digital board 43 and the analog board 28 are electromagnetically shielded mutually.

On the upper portion of the body 100, that is, on the upper portion of the first shielding member 18, a housing 16 is attached. In the housing 16, a shielding member 14, an EL element 13 used as a back light for an LCD 11, and the LCD 11 are positioned and contained. On an end, a heat seal 12 for giving an electrical contact to the LCD 11.

In each of the housing 16 and the first shielding member 18, through holes 16a and 18a are formed for passing contact rubbers 17 therethrough. In the insulating sheet 25, notches 25a are formed so as not to obstruct the way of the contact rubbers 17. Each of the contact rubbers 17 comprises conductive particles dispersed therein and becomes conductive by being pressed. On the analog board 28, a pair of contacts are provided at each position corresponding to the through holes 16a. As shown in FIG. 1, switch buttons 335 are provided on the upper case 301. When a user presses one of the switch buttons, a corresponding contact rubber 17 is pressed to cause a conductive state between a pair of contacts. Accordingly, a desired operation can be carried out.

In the standing and surrounding periphery 48 of the second shielding member 47, different notches are formed. In the notches, switch pieces 48b are provided so that they can elastically deform.

On the other hand, switch electrodes 28a are provided on the analog board 28. These switch electrodes 28a project through slit portions 18b which are provided on the first shielding member 18.

As shown in FIG. 1, switch buttons 331 are provided on the upper case 301. When a user presses one of the switch buttons 331, a corresponding switch piece 48b is brought into contact with the switch electrode 28a. Accordingly, a desired operation can be carried out.

The top end of each switch piece 48b has an inwardly folded shape, and each of the switch electrodes 28a has an arch-shaped cutout so that the top end of each switch piece 48b can be in contact with each of the switch electrodes 28a suitably.

Next, the battery containing section 340 will be explained in detail, as follows.

As shown in FIG. 15, the battery 344 has a cylindrical shape, and has a plus (+) terminal portion 345 and a minus (−) terminal portion 346 at both ends.

The conductive member 500 is made of conductive material and is formed in an approximately cylindrical and a half body shape, as shown in FIGS. 15 and 16. The conductive member 500 comprises: a contacting portion (first terminal) 501 to which one of the terminals, e.g., (+) terminal portion 345, of the battery 344; and a power takeoff portion which is electrically connected to the contacting portion 501 and positioned by the side surface of the battery 500, i.e., a side surface 503 of the conductive member 500.

The contacting portion 501 is formed continuously to the side surface 503 through steps 502 and 502 and projects from an end surface of the cylindrical shape.

When covering the battery 344 with such a conductive member 500 so that the inner surface of the contacting portion 501 is brought into contact with the terminal portion 345 of the battery 344, at least a portion of the battery 344 is hidden by the side wall 503 of the conductive member 500. In the embodiment, the battery 344 is almost covered.

Therefore, in the state, the terminal portion 345 of the battery 344 is drawn around to a position by the side surface of the battery 344, through the conductive member 500.

As shown in FIG. 12, in the vicinity of a battery containing chamber 349 of the battery containing section 340 in the upper case 301, a slit portion 530, i.e., a portion to be inserted, which is electrically connected by soldering to an element to which the power of the battery 344 is supplied.

An electrode member 520 is made of conductive material. The electrode member 520 comprises a contact portion 522 formed at an end thereof, an insertion portion 521 formed at the other end thereof, a flexible portion 524 lying midway between the insertion portion 521 and the contact portion 522, and a stopper 523. The contact portion 522 is brought into contact with the side surface 503 of the conductive member 500. The insertion portion 521 is inserted into the slit portion 530. The flexible portion 524 can elastically deform and return. The stopper 523 functions as a stopper when inserting the insertion portion 521 into the slit portion 530.

The insertion portion 521 of the electrode member 520 is inserted into the slit portion 530 formed in the upper case 301 until the stopper 523 is brought into contact with the upper case 301, and is positioned. At the position, the electrode member 520 is electrically connected to the element to which the power of the battery 344 is supplied. In this state, the contact portion 522 of the conductive member 520 is inside the battery containing chamber 349 so that the contact portion 522 can be brought into contact with the side surface 503 of the conductive member 500 when the battery 344 and the conductive member 500 are contained into the battery containing chamber 349 suitably.

Another conductive member 510 comprises a coil spring which constitutes a contact portion (second terminal) 511 for contacting the top end thereof with the minus terminal portion 346 of the battery 344, formed at an end and a power takeoff portion 512 formed at the other end. The conductive member 510 is fixed to the upper case 301 so that the contact portion 511 of the conductive member 510 is positioned in the minus terminal side of the battery containing chamber 349, and the power takeoff portion 512 is positioned at a side portion of the battery containing chamber 349, as shown in FIG. 12. The power takeoff portion 512 is electrically connected to the element to which the power of the battery 344 is supplied, by soldering.

As shown in FIG. 12, the battery 344 which is covered by the conductive member 500 so that the inner surface of the contacting portion 502 is brought into contact with the terminal portion 345 of the battery 344, is inserted into the battery containing chamber 349 of the battery containing section 340 from the minus terminal side 346. A cover 341 is screwed into a female screw 301a of the upper case 301 with pressing the battery 344 against the contact portion 511 of the conductive member 510 by the pressing portion 342 of the cover 341 through the contacting portion 502 of the conductive member 500. Thus, the battery 344 half covered by the conductive member 500 is disposed in the battery containing chamber 349 while the minus terminal 346 is in contact with the contact portion 511 of the conductive member 510 and the back surface of the contacting portion 501 of the conductive member 500 is brought into contact with the plus terminal 345 of the battery 344.

As a result, the side surface 503 of the conductive member 500 is electrically in contact with the contact portion 522 of the conductive member 520. Accordingly, the plus terminal 345 of the battery 344 is electrically connected to the element to which the power of the battery 344 is supplied, through the conductive member 500 and the conductive member 520.

On the other hand, the minus terminal side 346 of the battery 344 is electrically connected to the contact portion 511 of the conductive member 510 and is electrically connected to the element to which the power of the battery 344 is supplied, through the conductive member 510.

The cover 341 and the upper case 301 are air-tightly sealed through two O-rings 550.

Next, the structure of the connecting portion between the heat seal 12 and the digital board 43 will be explained in detail.

As shown in FIGS. 17, 18A and 18B, on an edge portion of the digital board 43, a terminal portion 260 which comprises a large number of pattern electrode line terminals 232 is formed.

The heat seal 12 comprises a connecting portion 240 for connecting with the terminal portion 260 of the digital board 43, on an edge portion thereof. In the connecting portion 240, on the lower surface of a base film of the heat seal 12, conductive layers 242 the number of which is equal to the number of the pattern electrode line terminals 232, are formed corresponding to the line terminals 232. The conductive layers 242 include metal filler. Each of the conductive layers 242 extends to another connecting portion 210 for LCD 11 in the other edge portion to electrically connect with the corresponding pattern electrodes of the LCD 11.

Each of the conductive layers 242 is buried in an adhesive layer 243 to separate to each other. The lower surface of each conductive layer 242 is a little covered with the adhesive layer 243 also.

The adhesive layer 243 is adhered to the upper surface of a permanent plated resist layers 250 which will be explained later, i.e., surfaces to be adhered 233, by pressing the connecting portion 240 against the terminal portion 260 with heating.

The permanent plated resist layers 250 are formed between the pattern electrode line terminals 232 of the terminal portion 260 of the digital board 43. The height of each permanent plated resist layer 250 is a little smaller than that of the line terminals 232. The upper surfaces of the permanent plated resist layers 250 are the above-described surfaces to be adhered 233. The difference between the heights of the permanent plated resist layer 250 and the line terminal 232 is about 10 $\mu$m.

In order to connect the above-described connecting portion 240 of the heat seal 12 with the terminal portion 260 of the digital board 43, the conductive layers 242 are positioned to face the corresponding pattern electrode line terminals 232 and thereafter pressed against the line terminals 232 with heating. Then, the metal filler contained in the conductive layers 242 break through the adhesive layer 243 which cover the lower surface of the conductive layer 242 a little. As a result, each conductive layer 242 is connected with each corresponding line terminal 232. At the same time, the adhesive layers 243 between the conductive layers 242 go down a little together with the base film 241 and are adhered to the surfaces to be adhered 233.

Thus, the conductive state between the conductive layers 242 and the corresponding line terminals 232 can be kept.

Because the difference between the upper surfaces of the permanent plated resist layer 250 and the line terminal 232 is set small, i.e., about 10 $\mu$m, it is possible to suppress the depression of the adhesive layers 243 between the conductive layers 242 and of the corresponding portion of the base film 241. Accordingly, it is possible to make the adhesion area between each adhesive layer 243 and each surface 233 to be adhered larger than that in the case of no permanent plated resist layers 250, even if the width between the line terminals 232 is the same in the both cases. As a result, it is possible to enhance the adhesive strength between each adhesive layer 243 and each surface 233 to be adhered, to connect the connecting portion 240 of the heat seal 12 with the terminal portion 260 of the digital board 43 certainly, in comparison with the case of no permanent plated resist layers 250, that is, the case of the difference between the upper surfaces of the surfaces to be adhered 233 and the line terminal 232 being larger.

Consequently, it is possible to set the width of the connecting portion 240 of the heat seal 12 narrower.

According to the first embodiment of the present invention, because the wrist instrument is a GPS watch 300 with a band 310 and 311 for wearing the GPS watch 300 on the user's wrist, it is possible to use it with wearing on the wrist.

It is possible to know the data created by processing signals from the receiving circuit section, e.g., position measurement data (present positioning information) or the like, by means of the display section 320 which is provided in the front side of the instrument case 309. Further, various types of operations can be carried out by using the operational sections 331 and 336 which are arranged at the periphery of the instrument case 309. Because of having the battery containing section 340 for containing a battery as an electric power, it is suitable for portable use.

Because the antenna section 350 containing the GPS receiving antenna 23 is arranged in the left side of the display section 320 for the user, the operational section 331 is arranged on the right peripheral portion of the instrument case 309, and the operational section 336 is arranged in this side of the display section 320. Therefore, when the GPS watch 300 is worn on a left wrist of the user and the operational sections 331 and 336 are operated by the right hand, it is possible to prevent the GPS receiving antenna 23 from shielding by the right hand and to prevent the display of the display section 320 from shielding by the hand. Therefore, it is possible to operate the operational sections 331 and 336 suitably while not only receiving signals by the GPS receiving antenna 23 but also seeing the display on the display section 320.

The antenna section 350 is arranged in the left side of the display section 320, and the pair of band members 310 and 311 are attached to the band attachments 303 and 304 of the instrument case 309, to sandwich the display section 320, and the antenna section 350 is arranged in the left side of the display section 320. Therefore, when wearing the GPS watch 300 on the left arm by using the pair of band members 310 and 311, the expanded antenna section 350 does not touch to the back of hand even if bending the left wrist upward. Therefore, it is possible to wear the GPS watch 300 comfortably.

The battery containing section 340 is arranged in the other side for the user, with respect to the GPS receiving antenna 23 and the display section 320 in the embodiment, inside the instrument case 309. Because the arrangement space for the battery containing section 340 is not interfered with by the arrangement space for the antenna section 350 containing the GPS receiving antenna 23 and the display section 320, it is possible to use a battery having a large size and a large capacity.

The whole instrument case 309 has an arch-shaped vertical section in the band extending direction. Accordingly, the GPS watch 300 tends to fit a wrist when wearing the GPS watch 300 on the wrist by using the pair of band members 310 and 311.

Because the analog board 28 and the digital board 43 are separated by the electromagnetic shielding partition member 34 and both are disposed inside the electromagnetic shielding body 100 which comprises the first and second shielding members 18 and 47, the analog board 28 is not influenced by electromagnetic noise from the digital board 43. Further, both the analog board 28 and the digital board 4 are not influenced by electromagnetic noise from the outside of the shielding body 100.

The body 100 comprises a first half body shielding member 18 having a standing and surrounding periphery 19 and a second half body shielding member 47 having a standing and surrounding periphery 48, which face and are coupled to each other by fitting one of the standing and surrounding peripheries 19 and 48 into the other thereof; an analog board 28 are disposed in the upper half body shielding member 18; and switch pieces 48b for performing switching for analog board 28 are provided in the standing and surrounding periphery 48 of the second shielding member 47 so that they can elastically deform. Accordingly, a portion of the electromagnetic shielding body can be also used as a switch for performing switching for analog board 28. It provides space-saving on design for a GPS watch 300.

Because the battery containing section 340 comprises the conductive member 500 which comprises: a contacting portion 501 to which one of the terminals, e.g., (+) terminal portion 345, of the battery 344; and a power takeoff portion which is electrically connected to the contacting portion 501 and positioned by the side surface of the battery 500, the terminal portion 345 of the battery 344 can be drawn around to a position by the side surface of the battery 344, through the conductive member 500. As a result, it is possible to enhance the degree of freedom on layout of wiring.

The conductive member 500 is formed in an approximately cylindrical and a half body shape, and comprises: a contacting portion 501 to which one of the terminals of the battery 344; and a power takeoff portion which is electrically connected to the contacting portion 501 and is a side circumferential surface 503 of the conductive member 500. Accordingly, it is possible to take out the power of the battery from anywhere on the side circumferential surface 503 of the conductive member 500 and to set the battery 344 into the battery containing chamber 349 easily.

Because the insertion portion 521 of the electrode member 520 is inserted into the slit portion 530 and fixed to the battery containing section 340, it is possible to prevent the insertion portion 521 from vibration by a shock from the side of the battery 344 or by an external shock. As a result, it is possible to prevent the transfer of the vibration to the inner devices of the GPS watch through the electrode member 520 and thereby, for example, to prevent peeling of solder.

Because the difference between the upper surfaces of the surfaces to be adhered 233 of the digital board 43 and the line terminal 232 is set small, i.e., not more than 15 μm, e.g., about 10 μm, it is possible to make the adhesion area between each adhesive layer 243 and each surface 233 to be adhered of the terminal portion 260 sufficiently even if the width between the line terminals 232 is a little narrow. As a result, it is possible to connect the connecting portion 240 of the heat seal 12 with the terminal portion 260 of the digital board 43 certainly.

Consequently, it is unnecessary to set the width of the side of the heat seal 12, for connecting to the digital board 43 large. For example, as shown in FIG. 17, it is possible to set the width of the connecting portion 240 between the heat seal 12 and the digital board 43 small, like the connecting portion 210 between the heat seal 12 and the LCD 11.

Although the height between the upper surfaces of the surfaces 233 to be adhered of the digital board 43 and the pattern electrode line terminals 232 may be not more than 15 μm, it is referable to be not more than 10 μm.

Although only the GPS watch 300 is shown as an example f the wrist device in the above-described first embodiment, the wrist device may be one other than a GPS watch, e.g., one having only the GPS function or the like.

In the first embodiment, the inside of the electromagnetic shielding body 100 is partitioned into upper and lower parts by the electromagnetic shielding partition member 34 so that the upper and lower parts of the body 100 are electromagnetically shielded mutually, and the analog board 28 is disposed in the upper part and the digital board is disposed in the lower part. However, the analog board 28 can be disposed out of the electromagnetic shielding body 100 without the electromagnetic shielding partition member 34.

Although only one conductive member 500 with an approximately cylindrical and half body shape is used for setting the battery 344 in the battery containing chamber 349, two conductive members may be also used for the first and second terminal portions 345 and 346 of the battery 344. In this case, it is preferable to use two conductive members having a length smaller than that of the conductive member 500 shown in FIG. 15 so that the two conductive members are not in contact with each other.

Further, although only a slit 530 is described as the portion to be inserted, the portion to be inserted maybe a groove. The figure of the end portion of the electrode member, which is inserted in the portion to be inserted may be any shape corresponding to the portion to be inserted.

Figure 19A:
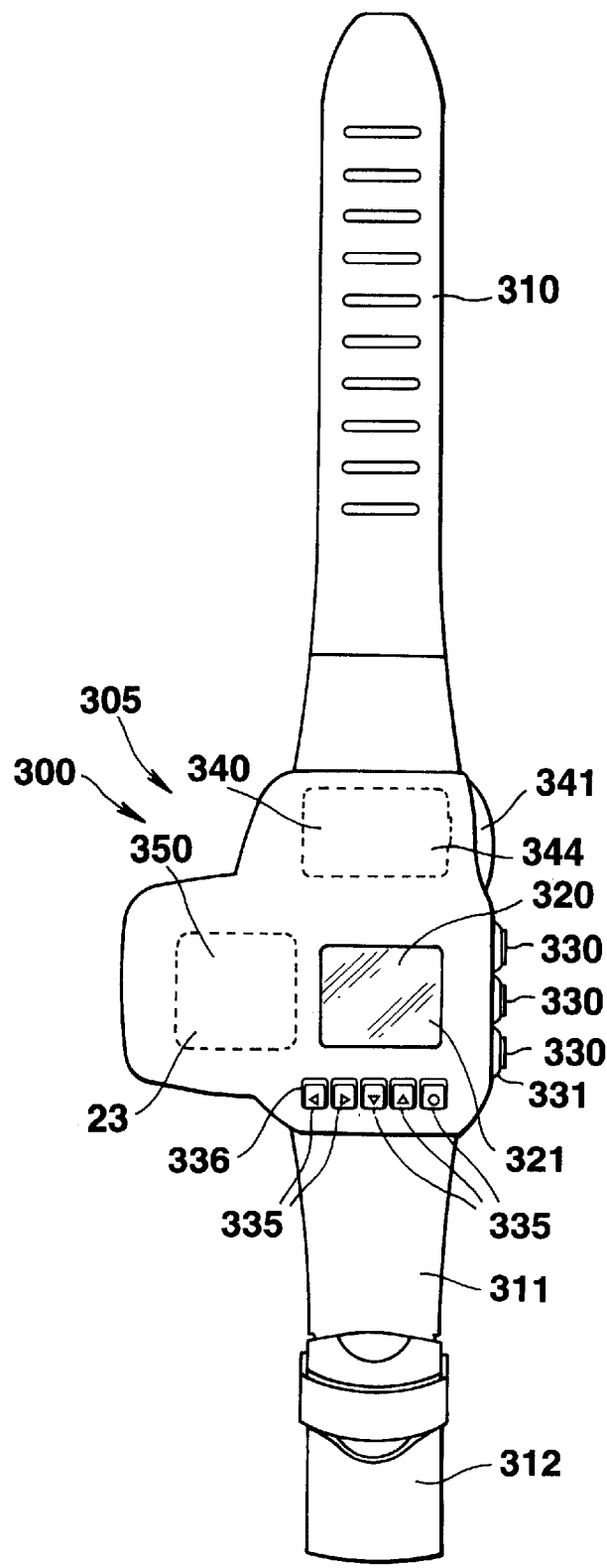
FIG. 19A is a schematic plan view of the GPS watch, for explaining the layout of the display section, the antenna section, the band members, the battery containing section, and the operating section, according to the first embodiment of the present invention.
Figure 19B:
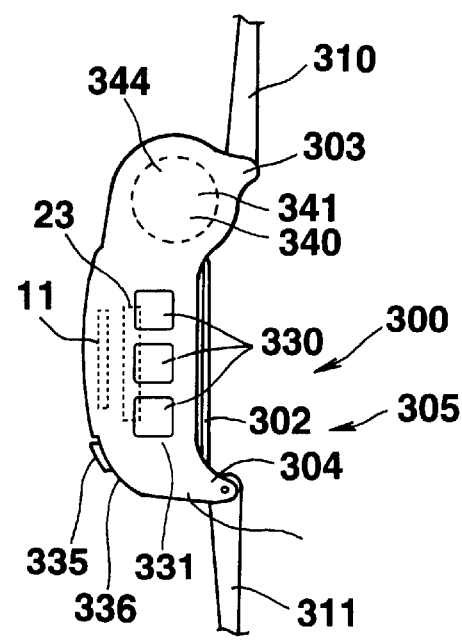
FIG. 19B is a schematic right side view thereof.

Second Embodiment:

A second embodiment of the invention will be explained with reference to FIGS. 20A–24B, with comparing FIG. 19A and B which are plan and side views of the GPS watch 300 according to the first embodiment, respectively.

FIGS. 20A–24B show first to fifth examples of GPS watch 400, 410, 420, 430, and 440, according to the second embodiment of the invention.

In FIGS. 20A–24B which show various types of GPS watch 400, 410, 420, 430, and 440, according to the second embodiment, the same numbers are attached to structural members, elements or the like corresponding to those of the first embodiment, and a detailed description for such structures and functions is omitted.

In the GPS watch 400, 410 and 420, in the second embodiment, the layout of at least one of the display section 320, the antenna section 350, band members 310 and 311, and the operational section 336 is different from that of the GPS watch 300 in the first embodiment.

Such differences of layout of at least one of the display section 320, the antenna section 350, band members 310 and 311, and the operational section 336 have an influence on the shape of the instrument cases 401, 411 and 421 of the GPS watch 400, 410 and 420. Therefore, the device bodies 405, 415 and 425 of the GPS watch 400, 410 and 420 have the instrument cases 401, 411 and 421, respectively, which are different from the instrument case 309 of the GPS watch 300 according to the first embodiment.

The structures and functions of the GPS watch 400, 410 and 420 other than the above-described differences; i.e., a different layout from at least one of the display section 320, the antenna section 350, band members 310 and 311, and the operational section 336; and a different shape from the instrument cases 401, 411 and 421; are approximately the same as the GPS watch 300 according to the first embodiment.

In the GPS watch 430 and 440, in the second embodiment, the layout of the battery containing sections 432 and 442 and the shape of the batteries 434 and 444 are different from those of the GPS watch 420 in the second embodiment.

Such differences of the layout of the battery containing sections 432 and 442 and the shape of the batteries 434 and 444 have an influence on the shape of the instrument cases 431 and 441 of the GPS watch 430 and 440. Therefore, the device bodies 435 and 445 of the GPS watch 430 and 440 have the instrument cases 431 and 441, respectively, which are different from the instrument case 421 of the GPS watch 420 according to the second embodiment.

The structures and functions of the GPS watch 430 and 440 other than the above-described differences; i.e., different layout of the battery containing sections 432 and 442 and different shape of the batteries 434 and 444; are approximately the same as the GPS watch 420 according to the second embodiment.

Figures 20A, 20B:
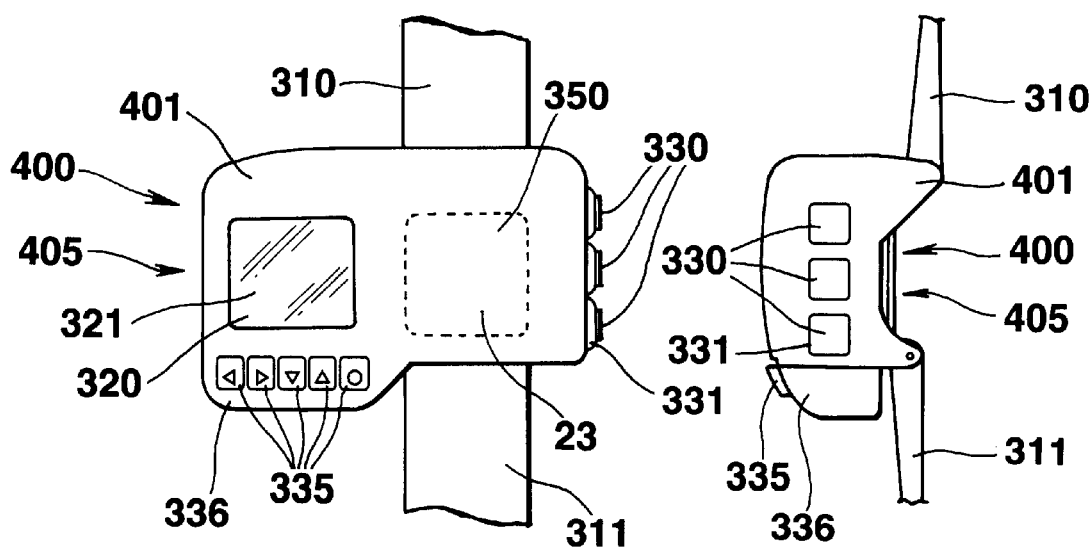
FIG. 20A is a plan view of the GPS watch according to a first example of a second embodiment of the invention.
FIG. 20B is a side view thereof.

In the GPS watch 400, as shown in FIGS. 20A and 20B, the antenna section 350 is arranged at the right side of the display section 320, the operational section 336 is arranged at this side for the user to the display section 320, and the operational section 331 is arranged on the right side surface of the instrument case 401. The attachment portions for the band members 310 and 311 are faced to each other to sandwich the antenna section 350 containing the GPS receiving antenna 23.

According to the GPS watch 400, because the GPS receiving antenna 23 is arranged at the right side of the display section 320 for the user, when the GPS watch 400 is worn on a left wrist of the user and even if a portion of the GPS watch 400 is covered by the sleeve of clothes or the like, there is a little possibility of covering the GPS receiving antenna 23 by the sleeve of clothes or the like. As a result, it is possible to carry out reception by the GPS receiving antenna 23 suitably.

Because the GPS receiving antenna 23 is arranged at the right side of the display section 320 for the user, the operational sections 331 and 336 are arranged on the right side surface of the instrument case 401 and at this side for the user to the display section 320, respectively, when the operational sections 331 and 336 are operated by the right hand, it is possible to prevent the GPS receiving antenna 23 from shielding by the right hand. As a result, it is possible to carry out reception by the GPS receiving antenna 23 suitably.

Further, because the attachment portions for the band members 310 and 311 are faced to each other to sandwich the antenna section 350 containing the GPS receiving antenna 23, when wearing the GPS watch 400 on the left arm by using the band members 310 and 311, the display section 320 is positioned in the shoulder joint side of the left arm to the band members 310 and 311. Therefore, the expanded display section 320 does not touch to the back of hand even if bending the left wrist upward. Therefore, it is possible to wear the GPS watch 300 comfortably.

Figures 21A, 21B:
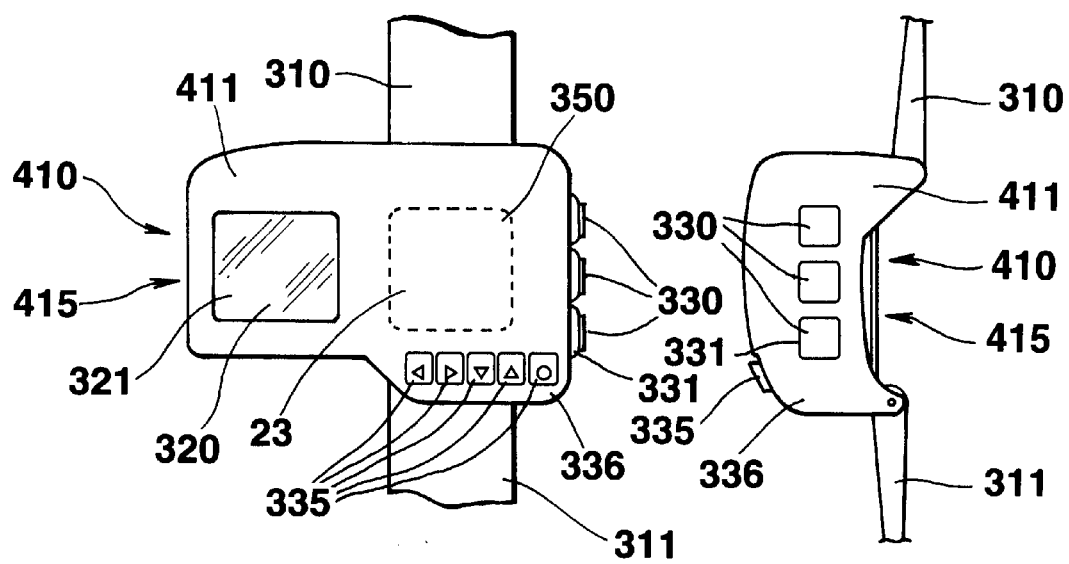
FIG. 21A is a plan view of the GPS watch according to a second example of a second embodiment of the invention.
FIG. 21B is a side view thereof.

As shown in FIGS. 21A and 21B, the GPS watch 410 differs from the GPS watch 400 in that the operational section 336 is arranged at this side for the user to the antenna section 350. Therefore, according to the GPS watch 410, it is possible to obtain approximately the same advantageous effects as the GPS watch 400.

As shown in FIGS. 22A and 22B, the GPS watch 420 differs from the GPS watch 400 in that the battery containing section 340 is arranged at the other side for the user to the antenna section 350, in the instrument case 421.

Therefore, according to the GPS watch 420, it is possible not only to obtain approximately the same advantageous effects as the GPS watch 400 but also to use a battery having a large size and a large capacity because the arrangement space for the battery containing section 340 is not interfered by the arrangement space for the GPS receiving antenna 23 and the display section 320.

As shown in FIGS. 23A and 23B, the GPS watch 430 differs from the GPS watch 400 in that the battery containing section 432 is arranged on the band member 436. As a battery 434, for example, a plate-like (disc-like or coin-like) thin battery is used. The battery containing section 432 is used also as a buckle for fastening the band members 436 and 311. In the band members 436, wiring 439 is provided for electrically connecting the battery containing section 432 with the body 435.

Therefore, according to the GPS watch 430, it is possible to obtain approximately the same advantageous effects as the GPS watch 400. Further, even if the hermetic sealing of the battery containing section 432 is broken when replacing an old battery with a new one and the like, and water or the like enters the battery containing section 432, it exerts no adverse effect on the instrument cases 431 because the battery containing section 432 is arranged on the band member 436.

As shown in FIGS. 24A and 24B, the GPS watch 440 differs from the GPS watch 400 in that the battery containing section 442 is arranged in the back side in the instrument case 441. As a battery 444, for example, a plate-like (disc-like or coin-like) thin battery is used.

Therefore, according to the GPS watch 440, it is possible to obtain approximately the same advantageous effects as the GPS watch 400. Because the battery containing section 442 is arranged in the back side in the instrument case 441, it is possible to make small the external dimension of the instrument case 441 in the band extending direction or in the perpendicular direction thereto. Accordingly, it is possible to make the instrument case 441 small to look at.

Figure 25:
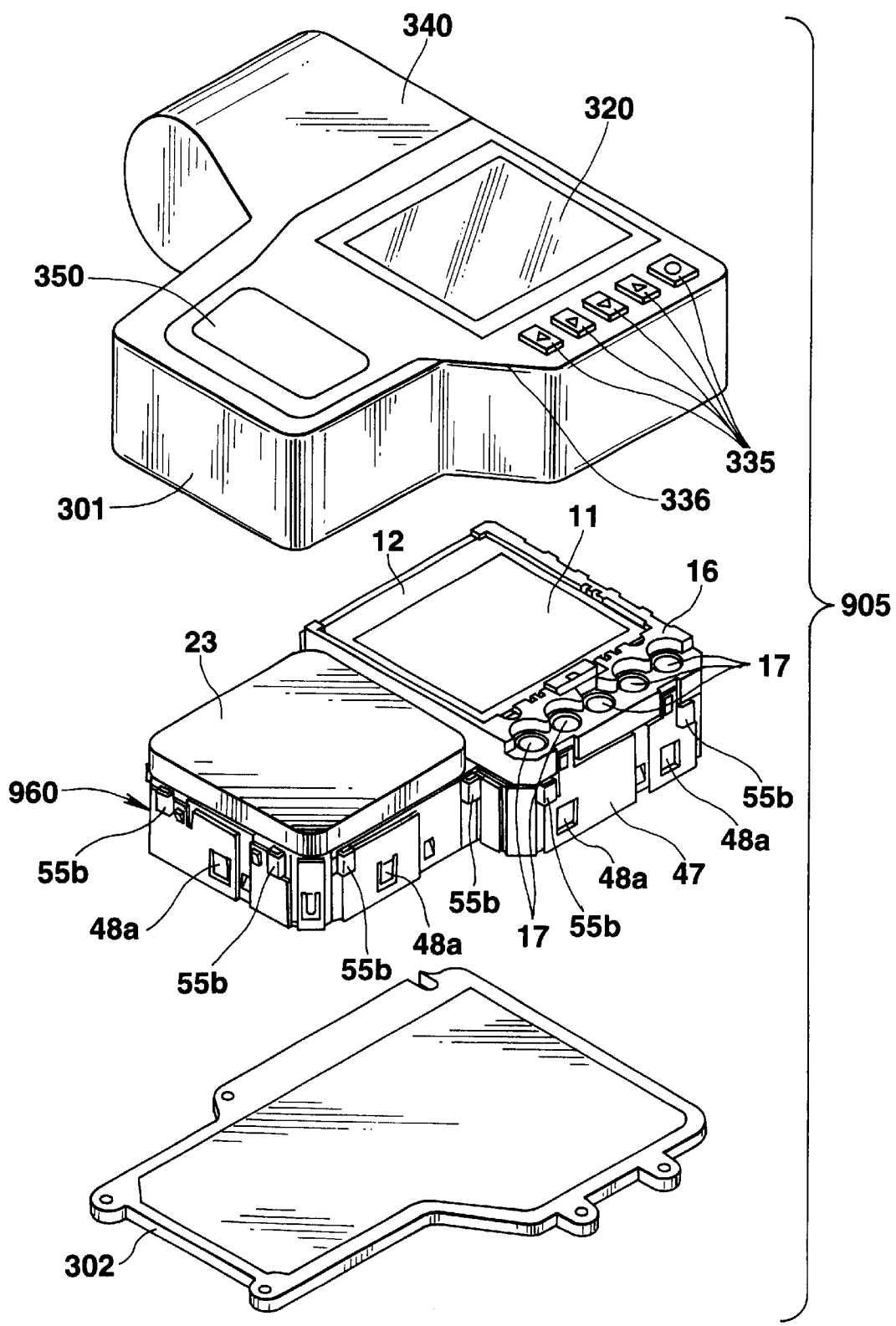
FIG. 25 is a disassembled perspective view of the GPS watch according to a third embodiment of the present invention.
Figure 26:
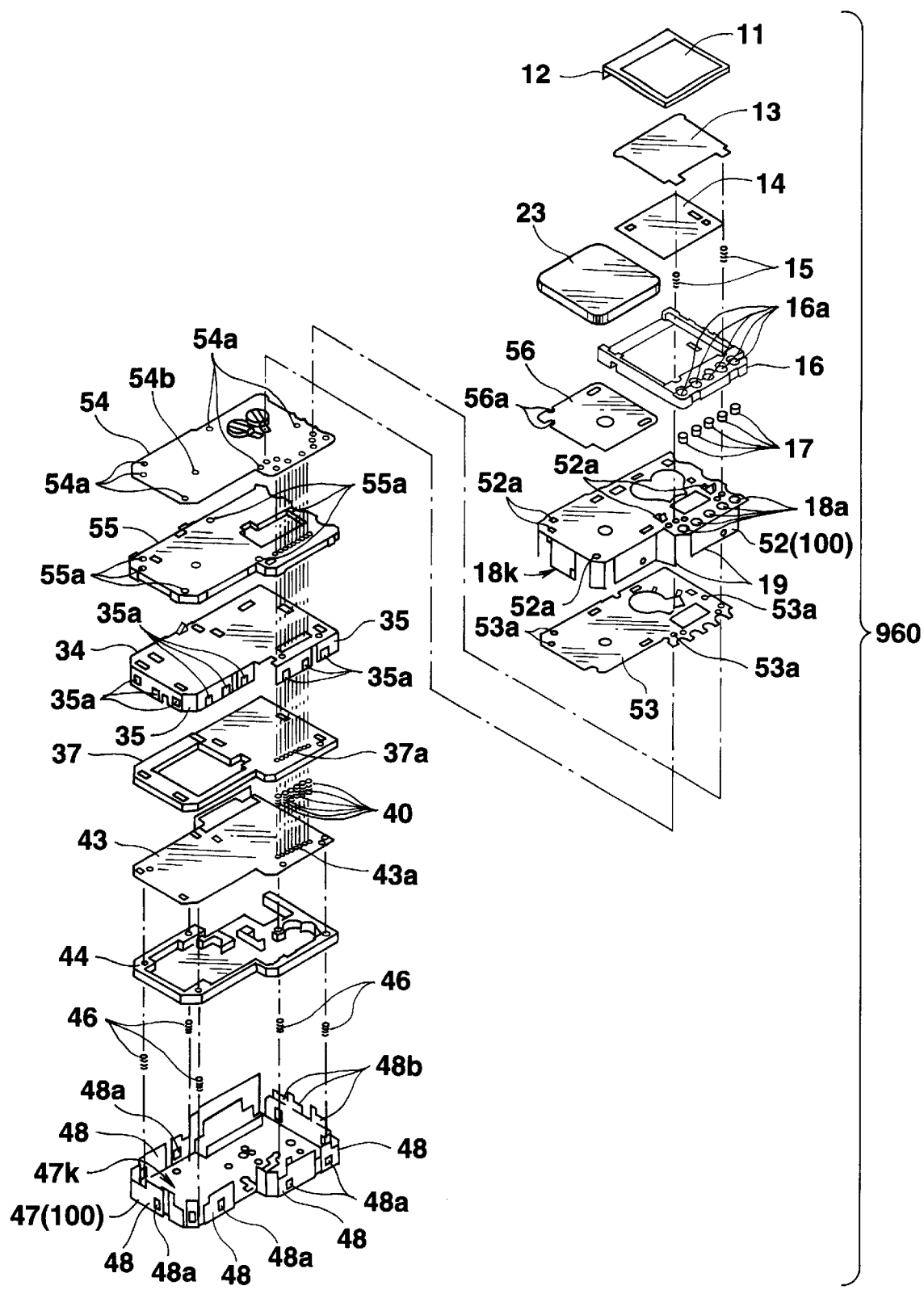
FIG. 26 is a disassembled perspective view of the inner apparatus and the like, of the GPS watch the embodiment.
Figure 27:
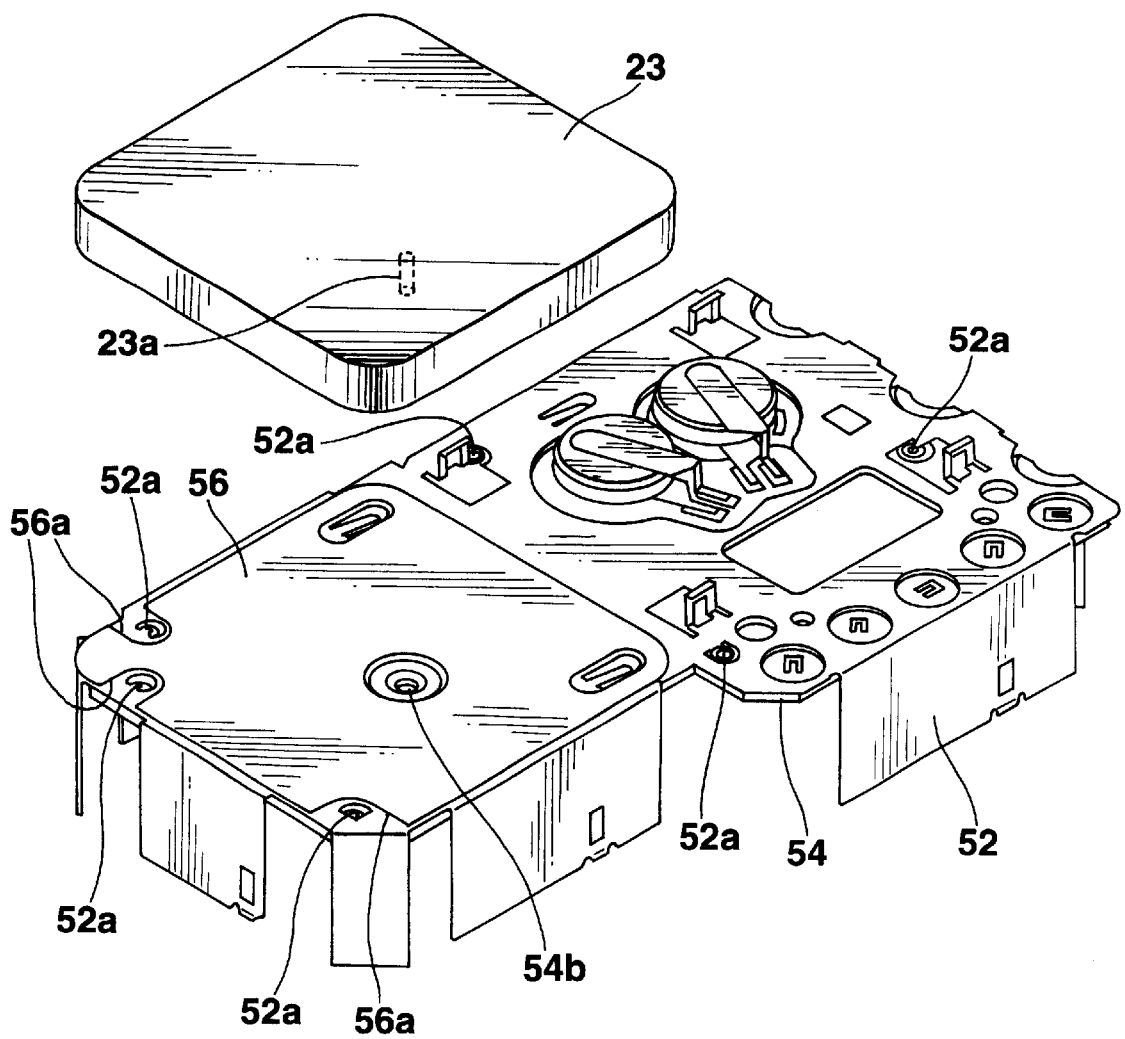
FIG. 27 is a view for explaining the attachment of the GPS receiving antenna.
Figure 28:
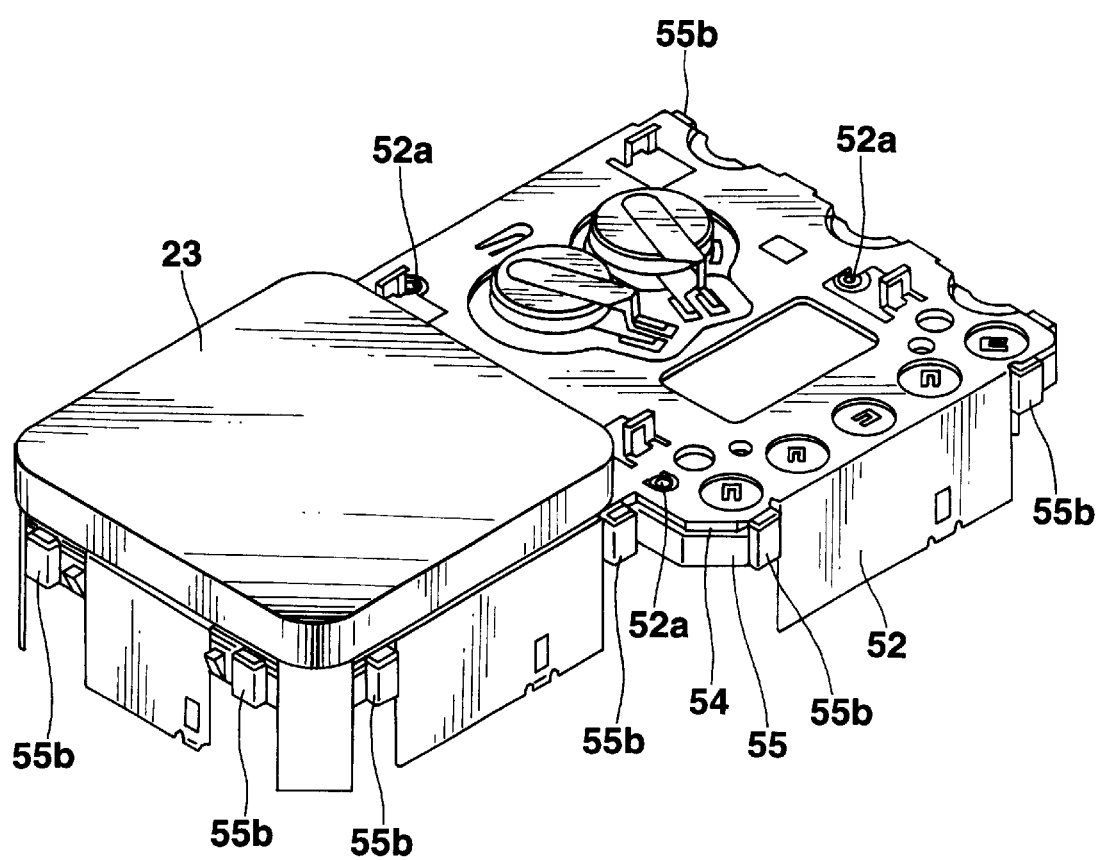
FIG. 28 is a perspective view of the shielding body to which the analog board and the like are assembled.

Third Embodiment:

A third embodiment of the invention will be explained with reference to FIGS. 25–28. The inner devices and the like 960 in the GPS watch according to the third embodiment include a lot of similar devices to those of the inner devices and the like 360 in the first embodiment. In FIGS. 25–28 which show the GPS watch according to the third embodiment, the same numbers are attached to structural members, elements or the like corresponding to those of the first embodiment, and a detailed description for such structures and functions is omitted FIG. 25 is a disassembled perspective view of the instrument body 905 in the GPS watch 900 according to the third embodiment of the present invention; FIG. 26 is a disassembled perspective view for explaining the inner devices and the like 960; FIG. 27 is a view for explaining the attachment of the GPS receiving antenna 23; FIG. 28 is a perspective view of the shielding body 52 to which the analog board 54 and the like are assembled; and FIG. 29 is a perspective view of the analog board 54 assembled to the housing 55.

As shown in FIGS. 26–28, a shielding member 52 which is like the first shielding member 18 in the first embodiment, has a plurality of hooks 52a which are formed along the periphery thereof.

Figure 29:
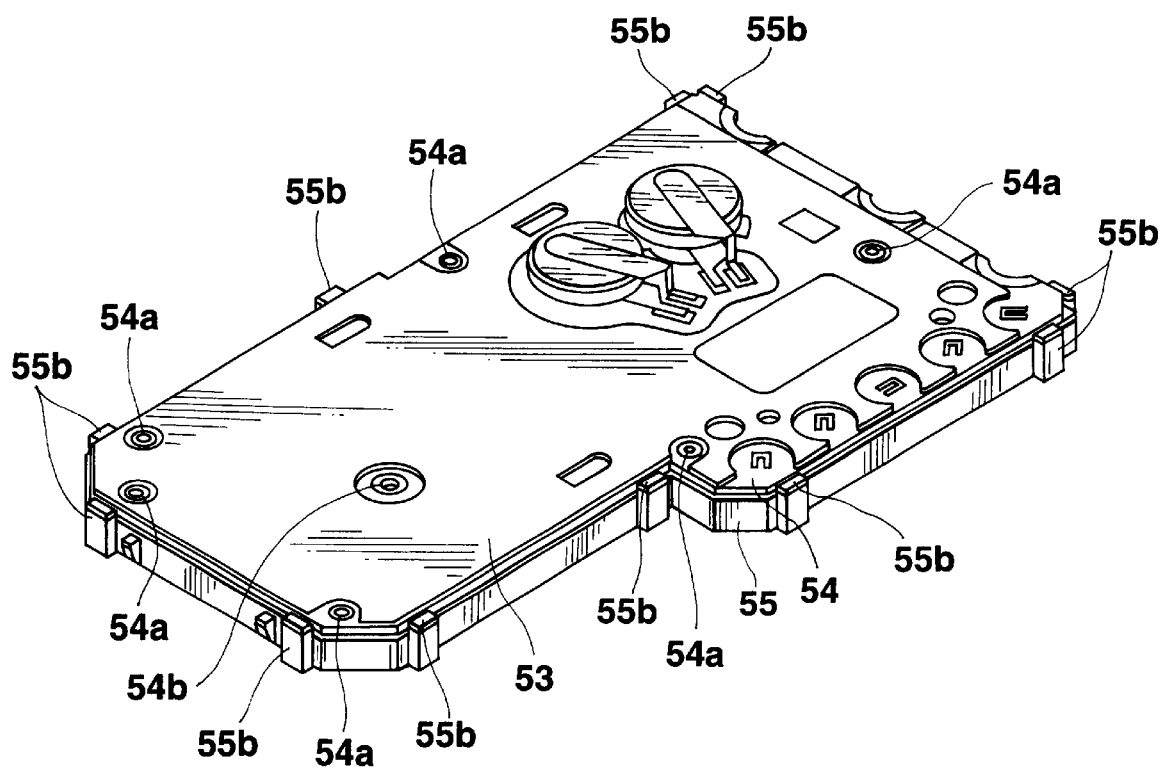
FIG. 29 is a perspective view of the analog board assembled to the housing.

In the analog board (circuit board) 54 which is like the analog board 28 in the first embodiment, a plurality of holes 54a for fitting the hooks 52a therein are formed at positions corresponding to the hooks 52a along the periphery thereof, as shown in FIGS. 26 and 29.

In a housing (plate for fixing) 55 which is like the housing 31 in the first embodiment, a plurality of recess portions 55a are formed at positions corresponding to the holes 54a along the periphery thereof, as shown in FIG. 26.

As shown in FIGS. 26 and 27, a pressure sensitive double coated conductive tape 56 has a plurality of notches 56a which are formed at positions corresponding to the hooks 52a provided on the shielding member 52 so that the hooks 52a are not covered by the pressure sensitive double coated conductive tape 56 when the conductive tape 56 is adhered on the shielding member 52.

In order to fit the hooks 52a provided on the shielding member 52 into the holes 54a formed in the analog board 54, a plurality of holes 53a are formed at corresponding positions in an insulating sheet 53.

On the peripheral portion of the housing 55, a plurality of positioning portions 55b are provided for positioning the analog board 54 to the housing 55, as shown in FIG. 28.

Components having the above-described structure are assembled in a following manner.

First, the analog board 54 is placed on the housing 55 by positioning the analog board 54 to the positioning portions 55b of the housing 55. Thereafter, the insulating sheet 53 is placed on the upper surface of the analog board 54. The shielding member 52 is assembled to the housing 55 by passing the hooks 52a through the holes 53a of the insulating sheet 53 and the holes 54a of the analog board 54. The hooks 52a are soldered to the recess portions 55a of the housing 55 through the holes 53a and the holes 54a. Thereby, the housing 55, the analog board 54, the insulating sheet 53 and the shielding member 52 are integrated.

After other components of inner devices and the like 960 are assembled like the first embodiment, the housing 55 is mounted to the upper case 301. As a result, the inner devices and the like 960 is mounted to the upper case 301.

A power supply pin 23a of the GPS receiving antenna 23 is soldered to fix to a power supply point 54b of the analog board 54, as shown in FIG. 27.

According to the third embodiment having the above-described construction, because the hooks 52a which is provided on the shielding member 52 are soldered to the recess portions 55a of the housing 55 through the holes 54a formed in the analog board 54, the integration of the shielding member 52, the analog board 54 and the housing 55 is favorably obtained. Further, it is possible to give the same electric potential to the analog board 54, the shielding member 52, and the GPS receiving antenna 23 which is soldered to fix to the power supply point 54b of the analog board 54. As a result, it is possible to further improve the electromagnetic shielding performance.

Because the analog board 54 is positioned by the positioning portions 55b of the housing 55, it is possible to prevent the analog board 54 from getting out of position to the housing 55.

Although only the GPS watch is explained as an electronic apparatus in the first, second and third embodiments, the invention can be applied to any small-sized electronic apparatus which requires electromagnetic shielding.

In the above embodiments, the body 100 for electromagnetic shielding, comprises a pair of half body members (first shielding member 18 or 52, and second shielding member 47) of shielding material. One of the pair is a first shielding member 18 or 52 having a standing and surrounding periphery 19 and an opening 18k at an end. The other of the pair is a second shielding member 47 having a standing and surrounding periphery 48 and an opening 47k at an end. The openings 18k and 47k of the first and second shielding members 18 and 47 are opposed to each other so that they can be coupled with each other by fitting one of the standing and surrounding peripheries 19 and 48 into the other thereof. However, fitting one of the standing and surrounding peripheries 19 and 48 into the other thereof is not essential. For example, it can be carried out by coupling the standing and surrounding peripheries 19 and 48 to each other without fitting one into the other.

Also for other concrete particular structures, it should be understood that various changes and modifications maybe made to the invention without departing from the gist thereof.

Fourth Embodiment:

A fourth embodiment of the invention will be explained with reference to FIGS. 30A–34.

Figures 30A, 30B:
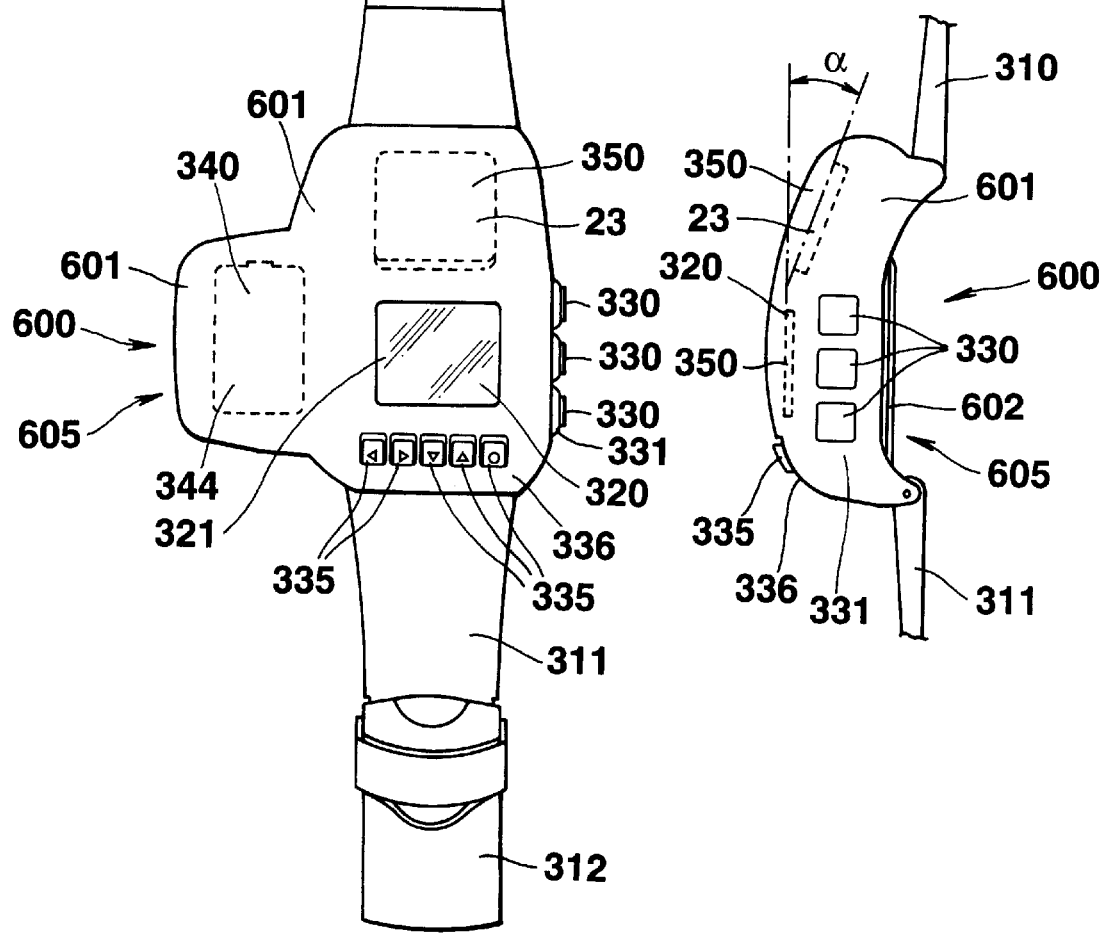
FIG. 30A is a plan view of the GPS watch according to a fourth embodiment of the present invention.
FIG. 30B is a side view thereof.
Figure 31:
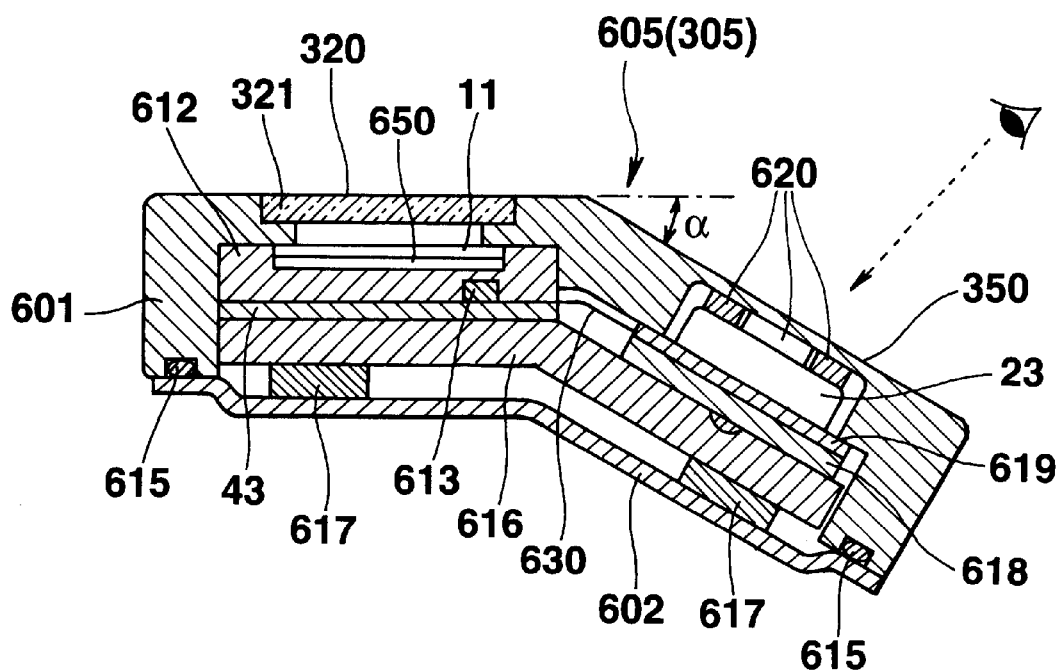
FIG. 31 is a vertical sectional view taken in the band attachment direction, of the GPS watch shown in FIG. 30A.
Figure 32:
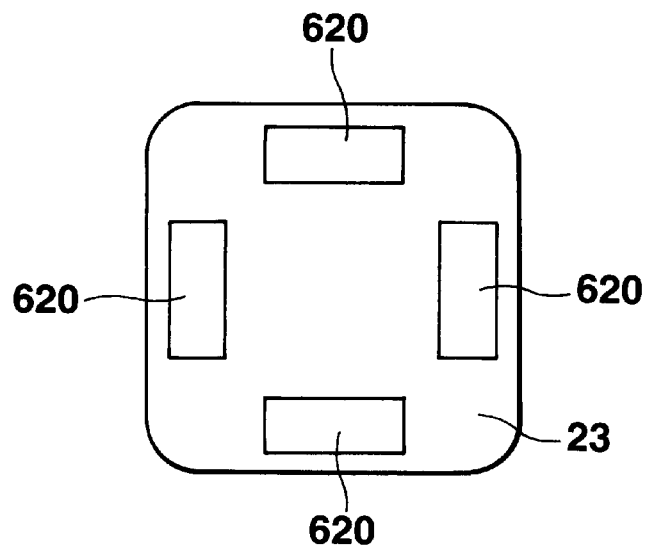
FIG. 32 is a plan view for showing an arrangement of antenna cushioning members.
Figure 33:
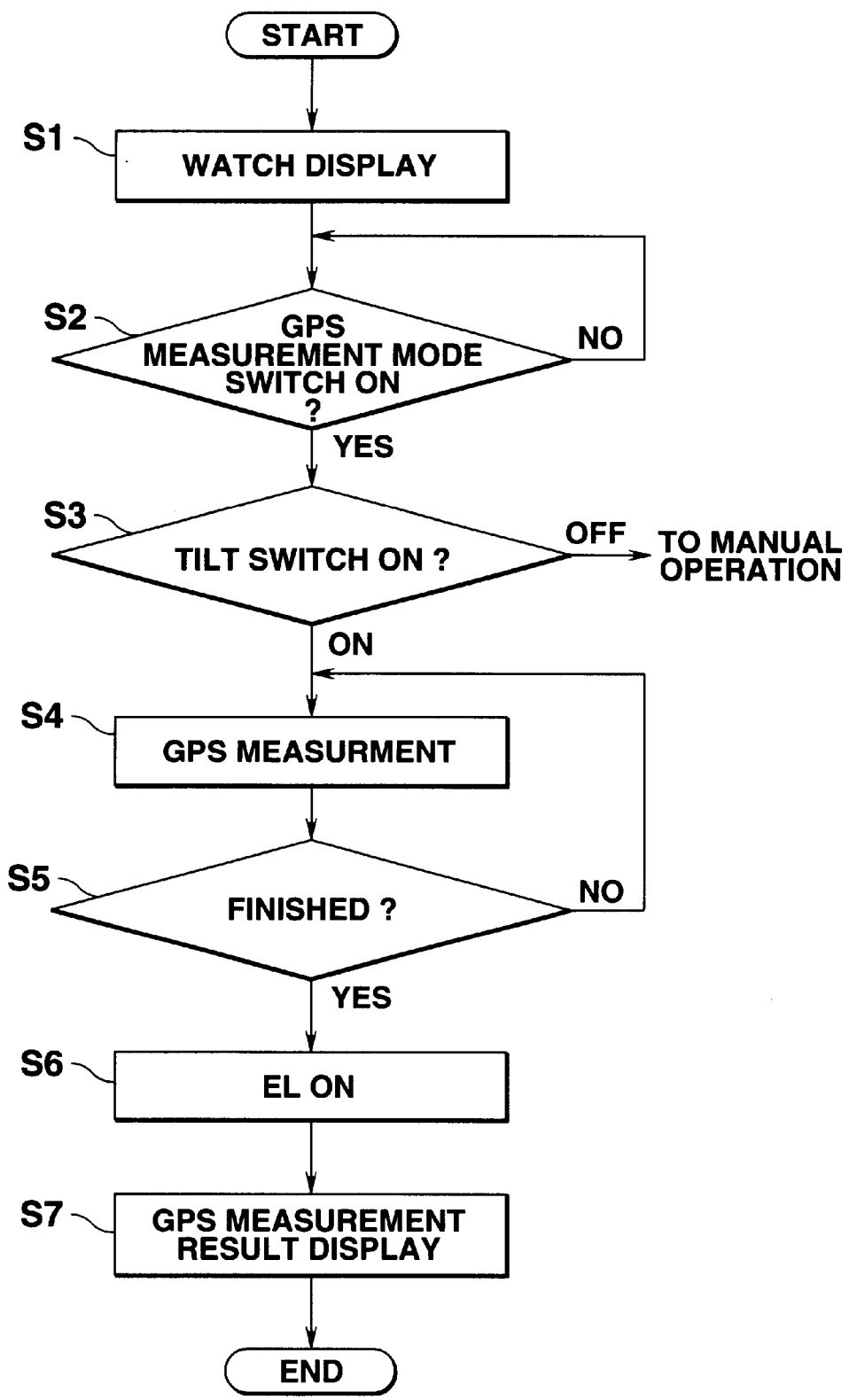
FIG. 33 is a flow chart showing an operation for GPS measurement of the GPS watch.
Figure 34:
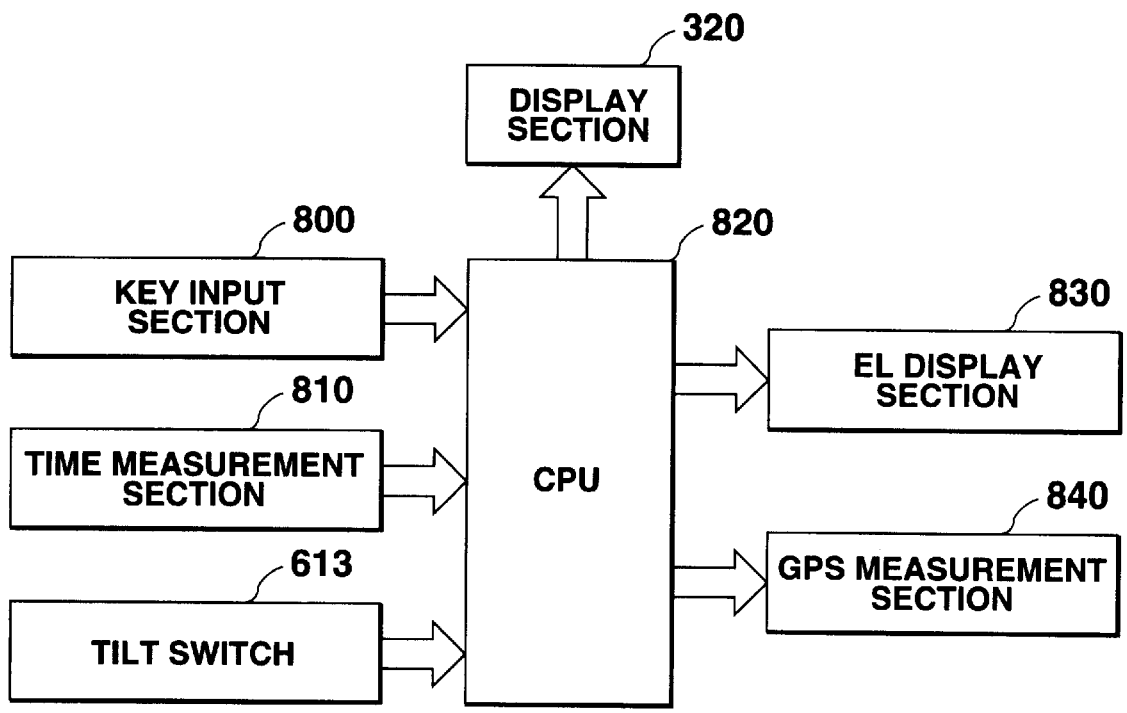
FIG. 34 is a block diagram of the GPS watch according to the fourth embodiment.

FIG. 30A is a plan view of the GPS watch 600 according to the fourth embodiment of the present invention, and FIG. 30B is a side view thereof; FIG. 31 is a vertical sectional view taken in the band extending direction, of the GPS watch 600 shown in FIG. 30A; FIG. 32 is a plan view for showing an arrangement of cushioning members 620 for the antenna 23; FIG. 33 is a flow chart showing an operation for GPS positioning measurement of the GPS watch 600; and FIG. 34 is a block diagram of the GPS watch according to the fourth embodiment.

The GPS watch according to the fourth embodiment differs from each of the above-described first to third embodiments in arrangement of the antenna section 350 including the GPS receiving antenna 23 and the display section 320, and in operation for GPS positioning measurement. The structures and functions of the GPS watch 600 other than the above-described differences are approximately the same as the GPS watch according to each of the first to third embodiments.

In FIGS. 30A to 34 which show the GPS watch 600 according to the fourth embodiment, the same numbers are attached to structural members, elements or the like corresponding to those of the first to third embodiments, and a detailed description for such structures and functions is omitted.

The main feature of the GPS watch 600 according to the fourth embodiment is that the GPS watch 600 has a display face of the display section 320 which is inclined at an angle α to the receiving face of the GPS receiving antenna 23 for a user to face the display face in a state of the receiving face being horizontal, for the sake of ease of seeing the display.

As shown in FIG. 30B, the body 605 of the GPS watch 600 comprises the display section 320 at approximately the center thereof, and the antenna section 350 containing the GPS receiving antenna 23 therein at the other side to the display section 320 for the user. In the left side of the display section 320 for the user, the battery containing section 340 is arranged so that the longitudinal direction thereof is approximately parallel to the band extending direction. The operational sections 336 and 331 are arranged at this side for the user to the display section 320 and on the right side surface of the upper case 601, respectively. The attachment portions for the band members 310 and 311 are faced to each other to sandwich the display section 320 and the antenna section 350.

As shown in FIG. 31, on the back side of the upper case 601, a case back 602 is attached by screws through an O-ring 615. The instrument case 609 comprising the upper case 601 and the case back 602, has a bent shaped vertical section in the band extending direction. In the instrument case 609, inner devices and the like are contained.

On the instrument case 609, a display window 321 is provided at the highest position in the central portion on this side for the user. Under the display window 321, an LCD device 11 is disposed to fix to the upper portion of a housing 612 which is fixed to the inside of the instrument case 609. Under the LCD device 11, a light luminescent panel (light emitting portion) 650 which is fixed to the upper portion of the housing 612, is provided.

Under the housing 612, a housing 616 which has a lower portion supported by the case back 602 through buffers 617, is provided apart from the housing 612. The housing 616 has a bent shaped vertical section in the band extending direction so as to correspond to the shape of the instrument case 609. The digital board 43 is sandwiched between the lower housing 616 in the other side and the upper housing 612. On the upper surface of the digital board 43, an inclination switch 613 is provided.

At a position on the housing 616 in this side for the user, the analog board 28 is sandwiched between the lower housing 616 and the upper housing 619 which is fixed to the inside of the instrument case 609. The analog board 28 and the digital board 43 are electrically connected to each other through wiring 630.

The GPS receiving antenna 23 is provided on the upper surface of the housing 619. Between the upper surface of the GPS receiving antenna 23 and the upper case 601, buffers 620 are provided to enhance the shockproof of the GPS receiving antenna 23.

The buffers 620 for the GPS receiving antenna 23 are arranged, for example, in the four sides on the GPS receiving antenna 23.

The GPS receiving antenna 23 and the display section 320, in the GPS watch 600 are arranged so that the receiving face of the GPS receiving antenna 23 is placed at a predetermined angle α to the display face of the display section 320, as shown in FIG. 30B.

Therefore, a display face of the display section 320 is inclined at a predetermined angle α to the receiving face of the GPS receiving antenna 23 toward the user when the receiving face is made horizontal.

When the inclination switch 613 inclines at a predetermined angle to the horizontal surface, the switch turns on. The inclination switch 613 is set to turn on when the receiving face of the GPS receiving antenna 23 is approximately horizontal to make the GPS receiving antenna 23 in a receiving condition.

When the switch turns on, an operation by the receiving circuit section, for example, an operation for GPS positioning measurement is started.

At approximately the same time that signal processing is finished by the receiving circuit section, on the basis of reception signal received through the GPS receiving antenna 23, data, e.g., measured positioning data generated by the signal processing are displayed by the display section 320.

The light luminescent panel 650 provided under the LCD device 11 functions as a back light for the display section 320. At approximately the same time that signal processing is finished by the receiving circuit section, on the basis of reception signal received through the GPS receiving antenna 23, the light luminescent panel 650 turns on.

FIG. 33 is a flow chart showing an operation for GPS measurement of the GPS watch and FIG. 34 is a block diagram of the whole GPS watch according to the fourth embodiment.

The CPU 820 controls the entirety of the GPS watch 600.

In the step S1, the CPU 820 conducts the display section 320 to display an ordinary watch display (time indication) on the basis of a time measurement by the time measurement section 810. When an operation of the key input section which includes the operational sections 331 and 336 is carried out in this state, the CPU 820 conducts a mode change to the GPS position measuring mode in the step S2. In the state, when a user moves his arm to make the receiving face of the GPS receiving antenna 23 approximately horizontal, the inclination switch 613 turns on in the step S3. In step S4, for example, the CPU 820 starts a GPS position measuring operation automatically on the basis of measurement of the GPS measurement section 840 containing the receiving circuit section and the data processing section. When the operation is completed in the step S5, the CPU 820 conducts the EL display section 830 to turn a light luminescent panel 613 on to display in the step S6. Thereafter, in the step S7, the display section indicates the data, e.g., the position a measured results data and the like, which is created by signal processing through the GPS measurement section 840.

As described above, in the fourth embodiment of the invention, because the display face of the display section 320 is inclined at a predetermined angle α to the receiving face of the GPS receiving antenna 23 toward the user when the user wears the GPS watch on a wrist so that the receiving face is horizontal, the user can see the indication on the display section 320 easily. Accordingly, it is possible to see the indication on the display section 320 with receiving.

Preferably, the predetermined angle α between the display face of the display section 320 and the receiving face of the GPS receiving antenna 23 is 0–60° from the viewpoint of design and handling property.

Because the operational section 336 is arranged on the same surface as the display section 320, it is possible to obtain a good handling property.

Further, in this embodiment, the inclination switch 613 which turns on when it inclines at a predetermined angle to the horizontal surface, is provided; and the inclination switch 613 is set to turn on when the receiving face of the GPS receiving antenna 23 is approximately horizontal to make the GPS receiving antenna 23 in a receiving condition, and thereby the signal operation by the receiving circuit section is started. Accordingly, by only making the receiving face of the GPS receiving antenna 23 approximately horizontal and making the GPS receiving antenna 23 in a receiving condition, the inclination switch 613 turns on and thereby the signal operation by the receiving circuit section is started. Therefore, it is possible to make the operation simple in comparison with the case in which only the operation using the operational sections 335 and 330 starts the signal operation by the receiving circuit section.

In this embodiment, the light luminescent panel 650 is provided as a back light for the display section 320; and at approximately the same time that signal processing is finished by the receiving circuit section, on the basis of reception signal received through the GPS receiving antenna 23, the light luminescent panel 650 turns on while the measured positioning data generated by the signal processing are displayed by the display section 320. As a result, a specific operation is not required to see the data and the data can be seen in a dark place easily.

In the embodiment, the antenna section 350 containing the GPS receiving antenna 23 therein and the display section 320 is disposed in the band extending direction, the battery containing section 340 is arranged in the left side of the antenna section 350 and the display section 320. Therefore, when wearing the GPS watch 600 on the left wrist by using the band members 310 and 311, the battery containing section 340 is positioned in the shoulder joint side of the left arm to the band members 310 and 311. Accordingly, the battery containing section 340 does not touch to the back of hand even if bending the left wrist upward. Therefore, it is possible to wear the GPS watch 600 comfortably.

Further, it is possible to use a battery having a large size and a large capacity because the arrangement space for the battery containing section 340 is not interfered by the arrangement space for the GPS receiving antenna 23 and the display section 320.

In the embodiment, the display face of the display section 320 is provided in approximately parallel to the case back 602 and the receiving face of the GPS receiving antenna 23 is inclined at a predetermined angle α to the display face, as shown in FIG. 30B. However, the receiving face of the GPS receiving antenna 23 may be provided in approximately parallel to the case back 602 and the display face of the display section 320 may be inclined at a predetermined angle α to the receiving face so that this side of the display face goes down to the other side.

In the embodiment, although only an application to watch indicating time on an LCD display section is explained, it is not limited such examples, for example, the present invention can be also applied to a watch having hands, a wrist instrument having no time display functions, e.g., an electronic compass instrument, an electronic depth measurement instrument and the like.

In the above-described electromagnetic shielding structure, although only an application to an electronic watch is explained, the present invention can be also applied to various types of electronic apparatuses, e.g., a personal computer, a portable telephone, a portable terminal, electronic note book and the like.

As described above, the wrist instrument with a band for wearing it on a wrist of a user, comprises: an instrument body (305) held by the band (310 and 311); a display section (320) disposed at a position easy to see on a front side of the instrument body; an operational section (336) disposed at a position on this side for the user, of the instrument body (305); a battery containing section (340) disposed at a position in an opposite side to the operational section (336); and a data receiving section (antenna section 350) disposed at a position near the display section (320).

The above-described band may comprise not only a pair of band members which are attached to the peripheral portions opposite to each other, of the instrument case, but also a single band member which can be attached to band attachments of the instrument body.

According to the wrist instrument, because the wrist instrument with a band for wearing it on a wrist of a user, comprises: an instrument body held by the band; a display section disposed at a position easy to see on a front side of the instrument body; an operational section disposed at a position on this side for the user, of the instrument body; a battery containing section disposed at a position in an opposite side to the operational section; and a data receiving section disposed at a position near the display section, it is possible to arrange various types of functional sections to the instrument body compactly.

Further, it is possible to see a necessary display easily by the display section disposed on a front side of the instrument body and to conduct various types of operations by the operational section disposed on the periphery of the instrument body. The wrist instrument is fit for portable use because of providing with the battery containing section for containing a battery as a power.

Preferably, the instrument body (305 or 605) comprises: a time measurement means (810) for measuring time; a data processing means(CPU820) for processing data received from the data receiving section (350); and a display control section (CPU 820) for making the display section (320) display at least one of the time measured by the time measurement means and the data processed by the data processing means.

According to the wrist instrument having such a construction, because the instrument body comprises: a time measurement means for measuring time; a data processing means for processing data received from the data receiving section; and a display control section for making the display section display at least one of the time measured by the time measurement means and the data processed by the data processing means, it is possible to make such data display on the display section to see.

In the wrist instrument, the data receiving section (350) may comprise a position information receiving antenna (23) for receiving a position information sent from an outside, which is disposed at a position in an attachment direction of the band (310 and 311), or at a position in a direction perpendicular to the attachment direction of the band and passing through the display section (320).

According to the wrist instrument having such a construction, because the data receiving section comprises a position information receiving antenna for receiving a position information sent from an outside, which is disposed at a position in an attachment direction of the band, or at a position in a direction perpendicular to the attachment direction of the band and passing through the display section, it is possible to prevent the positioning information receiving antenna from shielding by a hand and to prevent the display of the display section from shielding by the hand.

In the wrist instrument, the band may comprise a first band member (310) and a second band member (311), and an end of the first band member (310) is attached to the battery containing section (340) and an end of the second band member (311) is attached to a portion of the instrument body (305) in the side of the operational section (336).

According to the wrist instrument having such a construction, because the band comprises a first band member and a second band member, and an end of the first band member is attached to the battery containing section and an end of the second band member is attached to a portion of the instrument body in the side of the operational section, it is possible to wear the wrist instrument on a wrist by the first band member and the second band member.

In the wrist instrument, the battery containing section (340) may comprise: a cylindrical conductive member (500) having a cylindrical shape, for containing a battery (344) therein, a first terminal (501) which is formed at one end of the cylindrical conductive member to bring into contact with one terminal (345) of the battery, a second terminal (511) which brings into contact with the other terminal (346) of the battery, a cover member (341) which is attached to the instrument body in contact with the one end of the conductive member, for preventing the conductive member (500) from coming out of the battery containing section (340), and a power takeoff portion (520) which is electrically connected to the first terminal (501) and is provided on a side surface of the conductive member (500).

According to the wrist instrument having such a construction, because the battery containing section may comprise: a cylindrical conductive member having a cylindrical shape, for containing a battery therein, a first terminal which is formed at one end of the cylindrical conductive member to bring into contact with one terminal of the battery, a second terminal which brings into contact with the other terminal of the battery, a cover member which is attached to the instrument body in contact with the one end of the conductive member, for preventing the conductive member from coming out of the battery containing section, and a power takeoff portion which is electrically connected to the first terminal and is provided on a side surface of the conductive member, the terminal portion of the battery can be drawn around to a position by the side surface of the battery, through the conductive member. As a result, it is possible to enhance the degree of freedom on layout of wiring and the like, for the wrist instrument.

In the wrist instrument, the battery containing section (442;340) maybe disposed in a rear side of the instrument body (445;305).

In this case, preferably, a plate-shaped, e.g., a disc-shaped, and a square plate-shaped, battery is used as the battery.

According to the wrist instrument having such a construction, because the battery containing section may be disposed in a rear side of the instrument body, it is possible to make small the external dimension of the instrument case in the band attachment direction or in the perpendicular direction thereto. Accordingly, it is possible to make the instrument case 441 small to look at.

In the wrist instrument, the battery containing section (432;340) may be disposed on the band (436;310).

In this case, preferably, a plate-shaped, e.g., a disc-shaped, and a square plate-shaped, battery is used as the battery.

According to the wrist instrument having such a construction, because the battery containing section is disposed on the band, even if the hermetic sealing of the battery containing section is broken when replacing an old battery with a new one and the like, and water or the like enters the battery containing section, it exerts no adverse effect on the instrument cases because the battery containing section is arranged on the band member.

In the wrist instrument, the display face of the display section (320) may be inclined at an angle to a receiving face of the data receiving section (350) for a user to face the display face in a state of the receiving face being horizontal.

According to the wrist instrument having such a construction, because the display face of the display section (320) is inclined at an angle to a receiving face of the data receiving section (350) for a user to face the display face in a state of the receiving face being horizontal, when the user wears the GPS watch on a wrist so that the receiving face is horizontal, the user can see the indication on the display section 320 easily. Accordingly, it is possible to see the indication on the display section 320 with receiving.

In the wrist instrument, the instrument body (605;305) preferably comprise: an inclination detecting section (613) for detecting an inclination of angle of the instrument body in a predetermined range; and a reception processing section (820) which starts a reception processing of the data receiving section (350;840) when an inclination of angle in the predetermined range is detected.

According to the wrist instrument having such a construction, because the instrument body comprises: an inclination detecting section for detecting an inclination of angle of the instrument body in a predetermined range; and a reception processing section which starts a reception processing of the data receiving section when an inclination of angle in the predetermined range is detected, the inclination detecting section can detect an inclination angle in the predetermined range, of the instrument body to start the reception processing of the data receiving section. Therefore, it is possible to simplify the operation in comparison with, for example, the case that the reception processing is started by operating the operational section.

In the wrist instrument, the instrument body (605;305) may comprise a light luminescent section (luminescent panel 650;830) for emitting a light to illuminate the display section (320).

According to the wrist instrument having such a construction, because the instrument body may comprise a light luminescent section for emitting a light to illuminate the display section, the display on the display section can be seen in a dark place easily.

In the wrist instrument, the rear surface of the instrument body (605;305) is preferably curved to fit a wrist.

According to the wrist instrument having such a construction, because the rear surface of the instrument body (605;305) is curved to fit a wrist, the wrist instrument tends to fit a wrist when wearing the wrist instrument on the wrist by using the band.

In the wrist instrument, the instrument body (605) may comprise a watch section (810) for indicating or displaying time.

According to the wrist instrument having such a construction, because the instrument body comprises a watch section for indicating or displaying time, it is possible to see time.

Preferably, the electronic apparatus comprises: an apparatus case (309); a body (100) contained in the apparatus case (309), for electromagnetic shielding, the body comprising a pair of half body members (18 or 52 and 47) of shielding material, each pair having a standing and surrounding periphery (19 and 48) and an opening (18k and 47k) at an end, the half body members (18 or 52 and 47) coupled with each other by fitting an opening side of one half body member into an opening side of the other; and an electronic member (28 or 54 and 43) disposed in the body.

According to the electronic apparatus having such a construction, because the electronic apparatus comprises the body contained in the apparatus case, for electromagnetic shielding, and an electronic member disposed in the body, the electronic member is surrounded in almost all directions by the shielding body 18, and thereby it is possible to obtain an excellent electromagnetic shielding characteristics. Because an electronic member, e.g., a digital board and the like, which is a generation source of electromagnetic noise is disposed separately from another electronic member, e.g., an analog board, a receiving antenna and the like, which tends to be influenced by electromagnetic noise, through the shielding body, even if the electronic member which generates high-frequency digital noise and the electronic member which tends to be influenced by electromagnetic noise are disposed close to each other, the latter electronic member is not influenced by electromagnetic noise.

Therefore, even in an extremely small-sized electronic apparatus, e.g., an electronic watch or the like, it is possible to dispose the electronic member which tends to be influenced by electromagnetic noise close to the electronic member which generates high-frequency digital noise.

In the electronic apparatus, the electronic member may comprise: a plurality of electronic parts (28 or 54 and 43), and an electromagnetic shielding partition member (34) disposed between one part of the electronic parts and the other part thereof, for electromagnetic shielding the one part of the electronic part from the other part thereof.

According to the electronic apparatus having such a construction, because the electronic member comprises: a plurality of electronic parts, and an electromagnetic shielding partition member disposed between one part of the electronic parts and the other part thereof, for electromagnetic shielding the one part of the electronic part from the other part thereof, one part of the electronic parts can be electromagnetically shielded from the other part, also in the electromagnetic-shielding body.

Therefore, an electronic member, e.g., a digital board and the like, which is a generation source of electromagnetic noise is disposed separately from another electronic member, e.g., an analog board and the like, which tends to be influenced by electromagnetic noise, through the electromagnetic shielding partition member, in the electromagnetic-shielding body, even if the electronic member which generates electromagnetic noise and the electronic member which tends to be influenced by electromagnetic noise are disposed close to each other, in the electromagnetic-shielding body, the latter electronic member is not influenced by electromagnetic noise.

Even in an extremely small-sized electronic apparatus, e.g., an electronic watch or the like, it is possible to dispose the electronic member which tends to be influenced by electromagnetic noise close to the electronic member which generates high-frequency digital noise.

In the electronic apparatus, the half body members (18 or 52 and 47) maybe coupled with each other by fitting an opening side (19) of one half body member (18 or 52) into an opening side (48) of the other (47); and the electronic member (28 or 54 )may be disposed in one of the half body members, and a switching piece (48*b*) for switching the electronic member is elastically formed in the standing and surrounding periphery (48) of the other (47) of the half body members.

According to the electronic apparatus having such a construction, because a portion of the shielding body can be used also as a switching piece for switching the electronic member, it provides space-saving on design for an electronic apparatus.

The electronic apparatus, may further comprises: the electronic member(28 or 54 and 43) provided on a circuit board (54) which is disposed between the body (100) and a fixing plate (55); and the fixing plate (55) which is fixed to the apparatus case (309), for fixing the body (100) and the circuit board (54) to the apparatus case (309); wherein the body (100) is assembled to the fixing plate (55) by passing a hook (52*a*) provided on the body (100) through a hole (54*a*) formed in the circuit board (54) and by soldering the hook (52*a*) to a recess portion (55*a*) formed on the fixing plate (55).

According to the electronic apparatus having such a construction, because the hook is fixed to the recess portion formed on the fixing plate by soldering through the hole formed in the circuit board, it is possible to integrate the body and the circuit board to the apparatus case through the fixing plate, to make the electric potential of the shielding body the same as the circuit board, and to improve the electromagnetic shielding performance.

In the electronic apparatus, a positioning portion (55*b*) may be provided for positioning the circuit board (54) to the fixing plate (55) on the peripheral portion of the fixing plate.

According to the electronic apparatus having such a construction, because the positioning portion is provided for positioning the circuit board to the fixing plate on the peripheral portion of the fixing plate, it is possible to prevent the circuit board from getting out of position to the fixing plate and thereby to integrate the fixing plate and the circuit board suitably.

The electronic apparatus may further comprise a flexible heat seal (12) which comprises a connecting portion (240) for electrically connecting the circuit board (43) with another electronic member, wherein the circuit board (43) may comprise a plurality of pattern electrode line terminals (232), surfaces to be adhered (233), which are formed around the pattern electrode line terminals (232), and a terminal portion (260) to be connected with the connecting portion; the connecting portion (240) of the heat seal (12) may comprise conductive layers (242) which are formed to correspond to the line terminals (232) and the number of which is equal to the number of the pattern electrode line terminals (232), and adhesive layers (243) which are formed around the conductive layers (242) and adhered to the surfaces to be adhered (233) by pressing the connecting portion (240) against the terminal portion (260), to connect the connecting portion (240) with the terminal portion 260 and to electrically connect the conductive layers (242) with the corresponding pattern electrode line terminals (242); and the difference between the heights of the surfaces to be adhered (233) and the pattern electrode line terminals (232) may be not more than 15 $\mu$m.

The heat seal may be, for example, for electrically connecting the circuit board with the LCD device.

Preferably, the difference between the heights of the surfaces to be adhered and the pattern electrode line terminals is not more than 10 $\mu$m.

In order to set the difference between the heights of the surfaces to be adhered and the pattern electrode line terminals small, for example, around the pattern electrode line terminals, surfaces to be adhered having a height a little smaller than that of the line terminals may be formed, and the adhesive layer may be adhered to the upper surfaces to be adhered. The surfaces to be adhered may comprise permanent plated resist layers which are formed on the upper surface of the circuit board.

According to the electronic apparatus having such a construction, because the difference between the heights of the surfaces to be adhered and the pattern electrode line terminals is set small, i.e., not more than 15 $\mu$m, it is possible to-make the adhesion area between each adhesive layer and each surface to be adhered large, even if the width between the line terminals 232 is small. As a result, it is possible to connect the conductive layers with the line terminals certainly.

In the electronic apparatus, an antenna (23) may be arranged outside one (18) of the pair of half body members, and the antenna (23) and the electronic member (28 or 54 and 43) may be electromagnetically shielded mutually by the body (18).

According to the electronic apparatus having such a construction, because an antenna is arranged outside one of the pair of half body members, and the antenna and the electronic member are electromagnetically shielded mutually by the body, even if an electromagnetic member which is a generation source of electromagnetic noise is included in the body, it is possible to prevent the antenna from reception interruption.

In the electronic apparatus, the antenna (23) may be a GPS receiving antenna for receiving a signal from a GPS satellite, and the electronic member (28 or 54 and 43) may comprise a GPS receiving circuit section for processing the received signal from the GPS receiving antenna.

According to the electronic apparatus having such a construction, it is possible to receive a signal from the GPS satellite through the GPS receiving antenna, and to process the received signal from the GPS receiving antenna by the electronic member which is the GPS receiving circuit section. As a result, the electronic apparatus has a GPS function.

The electronic apparatus may further comprising: a pair of band members (310 and 311) which are attached to the peripheral portions opposite to each other, of the apparatus case (309), for wearing the electronic apparatus around a wrist; a display section (320) which is disposed in the front side of the electronic apparatus, for displaying the data generated by processing signals through the receiving circuit section; an operational section (331 and 336) which is disposed at the peripheral portion of the apparatus case (309), for operating the electronic apparatus; and a battery containing section (340) for containing a battery (344) as a power source.

According to the electronic apparatus having such a construction, because the electronic apparatus is a wrist instrument with a band, it is possible to use it with wearing on the wrist. It is possible to know the data created by processing signals from the receiving circuit section, e.g., position measurement data (present positioning information) or the like, by means of the display section which is provided in the front side of the apparatus case. Further, various types of operations can be carried out by using the operational sections which are arranged at the periphery of the apparatus case. Because of having the battery containing section for containing a battery as an electric power, it is suitable for portable use.

In the electronic apparatus, the GPS receiving antenna (23) maybe arranged in a side of the display section (320) except this side in a direction of the band member (310 and 311), for a user; and the operational section (331 and 336) is arranged in a side selected from a right peripheral side, this side of the display section and this side of the GPS receiving antenna (23), for the user.

In the electronic apparatus having such a construction, the position relationship between the GPS receiving antenna and the operational section includes some variation as follows.

(1) The GPS receiving antenna is arranged in the left side of the display section, and the operational section is arranged at at least one of the right side portion of the apparatus case, this side of the display section and this side of the GPS receiving antenna, for the user.

(2) The GPS receiving antenna is arranged in the right side of the display section, and the operational section is arranged at at least one of the right side portion of the apparatus case, this side of the display section and this side of the GPS receiving antenna, for the user.

(3) The GPS receiving antenna is arranged in the other side of the display section, and the operational section is arranged at at least one of the right side portion of the apparatus case, this side of the display section, and this side of the GPS receiving antenna.

In the case of the above (1), because the GPS receiving antenna is arranged in the left side of the display section, and the operational section is arranged at at least one of the right side portion of the apparatus case, this side of the display section and this side of the GPS receiving antenna, for the user, when the wrist instrument. is worn on a left wrist of the user and the operational sections are operated by the right hand, it is possible to prevent the GPS receiving antenna from shielding by the right hand and to prevent the display of the display section from shielding by the hand. Therefore, it is possible to operate the operational sections suitably while not only receiving signals by the GPS receiving antenna but also seeing the display on the display section.

In the case of the above (2), because the GPS receiving antenna is arranged in the right side of the display section, when the wrist instrument is worn on a left wrist of the user and even if a portion of the wrist instrument is covered by the sleeve of clothes or the like, there is a little possibility of covering the GPS receiving antenna by the sleeve of clothes or the like. As a result, it is possible to carry out reception by the GPS receiving antenna suitably.

Because the GPS receiving antenna is arranged at the right side of the display section for the user, the operational sections are arranged at at least one of the right side portion of the apparatus case, this side of the display section and this side of the GPS receiving antenna, for the user, when the operational sections are operated by the right hand, it is possible to prevent the GPS receiving antenna from shielding by the right hand.

In the case of the above (3), because the GPS receiving antenna is arranged in the other side of the display section, and the operational section is arranged at at least one of the right side portion of the apparatus case, this side of the display section, and this side of the GPS receiving antenna, when the operational sections are operated by the right hand, it is possible to prevent the GPS receiving antenna from shielding by the right hand.

In the electronic apparatus, two of the GPS receiving antenna (23), the display section (320) and the battery containing portion (340) may be arranged in a direction approximately perpendicular to the band direction, and the remaining one is arranged in the other side for a user; and the battery containing portion (340) is arranged in the apparatus case (309, 421 or 609).

According to the electronic apparatus having such a construction, because two of the GPS receiving antenna, the display section and the battery containing portion may be arranged in a direction approximately perpendicular to the band direction, and the remaining one is arranged in the other side for a user; and the battery containing portion is arranged in the apparatus case, all of the GPS receiving antenna, the display section and the battery containing portion are not arranged on a linear line in the apparatus case. Accordingly, the size in a direction, of the electronic apparatus is not large.

In particular, in the case that the GPS receiving antenna and the display section are arranged in a direction approximately perpendicular to the band direction, the battery containing portion is arranged in this side to the GPS receiving antenna and the display section for the user, in the apparatus case. In the case that the GPS receiving antenna and the display section are arranged in the band direction, the battery containing portion is arranged in the side in a direction approximately perpendicular to the band direction to the display section, in the apparatus case. Therefore, it is possible to use a battery having a large size and a large capacity because the arrangement space for the battery containing section is not interfered by the arrangement space for the GPS receiving antenna and the display section.

When the GPS receiving antenna and the display section are arranged in the band direction, and the battery containing portion is arranged in the left side to the GPS receiving antenna and the display section for the user wearing the electronic apparatus on the left wrist by using the band members, the battery containing section is positioned in the shoulder joint side of the left arm to the band members. Accordingly, the battery containing section does not touch to the back of hand even if bending the left wrist upward. Therefore, it is possible to wear the electronic apparatus comfortably.

As described above, according to the wrist instrument of the invention, because the wrist instrument with a band for wearing it on a wrist of a user, comprises: an instrument body held by the band; a display section disposed at a position easy to see on a front side of the instrument body; an operational section disposed at a position on this side for the user, of the instrument body; a battery containing section disposed at a position in an opposite side to the operational section; and a data receiving section disposed at a position near the display section, it is possible to arrange various types of functional sections to the instrument body compactly.

Further, it is possible to see a necessary display easily by the display section disposed on a front side of the instrument body and to conduct various types of operations by the operational section disposed on the periphery of the instrument body. The wrist instrument is fit for portable use because of providing with the battery containing section for containing a battery as a power.

According to the wrist instrument in which the instrument body comprises a time measurement means for measuring time; a data processing means for processing data received from the data receiving section; and a display control section for making the display section display at least one of the time measured by the time measurement means and the data processed by the data processing means, it is possible to make such data display on the display section to see.

According to the wrist instrument in which the data receiving section comprises a position information receiving antenna for receiving a position information sent from an outside, which is disposed at a position in an attachment direction of the band, or at a position in a direction perpendicular to the attachment direction of the band and passing through the display section, it is possible to prevent the positioning information receiving antenna from shielding by a hand and to prevent the display of the display section from shielding by the hand.

According to the wrist instrument in which the band comprises a first band member and a second band member, and an end of the first band member is attached to the battery containing section and an end of the second band member is attached to a portion of the instrument body in the side of the operational section, it is possible to wear the wrist instrument on a wrist by the first band member and the second band member.

According to the wrist instrument in which the battery containing section comprises: a cylindrical conductive member having a cylindrical shape, for containing a battery therein, a first terminal which is formed at one end of the cylindrical conductive member to bring into contact with one terminal of the battery, a second terminal which is formed at the other end of the conductive member to bring into contact with the other terminal of the battery, a cover member which is attached to the instrument body in contact with the one end of the conductive member, for preventing the conductive member from coming out of the battery containing section, and a power takeoff portion which is electrically connected to the first terminal and is provided on a side surface of the conductive member, the terminal portion of the battery can be drawn around to a position by the side surface of the battery, through the conductive member, and it is possible to enhance the degree of freedom on layout of wiring and the like, for the wrist instrument.

According to the wrist instrument in which the battery containing section is disposed in a rear side of the instrument body, it is possible to make small the external dimension of the instrument case in the band attachment direction or in the perpendicular direction thereto. Accordingly, it is possible to make the instrument case small to look at.

According to the wrist instrument in which the battery containing section is disposed on the band, even if the hermetic sealing of the battery containing section is broken when replacing an old battery with a new one and the like, and water or the like enters the battery containing section, it exerts no adverse effect on the instrument cases because the battery containing section is arranged on the band member.

According to the wrist instrument in which the display face of the display section is inclined at an angle to a receiving face of the data receiving section for a user to face the display face in a state of the receiving face being horizontal, when the user wears the GPS watch on a wrist so that the receiving face is horizontal, the user can see the indication on the display section 320 easily. Accordingly, it is possible to see the indication on the display section with receiving.

According to the wrist instrument in which the instrument body comprises: an inclination detecting section for detecting an inclination of angle of the instrument body in a predetermined range; and a reception processing section which starts a reception processing of the data receiving section when an inclination of angle in the predetermined range is detected, the inclination detecting section can detect an inclination angle in the predetermined range, of the instrument body to start the reception processing of the data receiving section. Therefore, it is possible to-simplify the operation in comparison with, for example, the case that the reception processing is started by operating the operational section.

According to the wrist instrument in which the instrument body comprises a light luminescent section for emitting a light to illuminate the display section, the display on the display section can be seen in a dark place easily.

According to the wrist instrument in which the rear surface of the instrument body is curved to fit a wrist, the wrist instrument tends to fit a wrist when wearing the wrist instrument on the wrist by using the band.

According to the wrist instrument in which the instrument body comprises a watch section for indicating or displaying time, it is possible to see time.

According to the electronic apparatus in which the electronic apparatus comprises the body contained in the apparatus case, for electromagnetic shielding, and an electronic member disposed in the body, the electronic member is surrounded in almost all directions by the shielding body 18, and thereby it is possible to obtain an excellent electromagnetic shielding characteristics. Because an electronic member, e.g., a digital board and the like, which is a generation source of electromagnetic noise is disposed separately from another electronic member, e.g., an analog board, a receiving antenna and the like, which tends to be influenced by electromagnetic noise, through the shielding body, even if the electronic member which generates high-frequency digital noise and the electronic member which tends to be influenced by electromagnetic noise are disposed close to each other, the latter electronic member is not influenced by electromagnetic noise.

Therefore, even in an extremely small-sized electronic apparatus, e.g., an electronic watch or the like, it is possible to dispose the electronic member which tends to be influenced by electromagnetic noise close to the electronic member which generates high-frequency digital noise.

According to the electronic apparatus in which the electronic member comprises: a plurality of electronic parts, and an electromagnetic shielding partition member disposed between one part of the electronic parts and the other part thereof, for electromagnetic shielding the one part of the electronic part from the other part thereof, one part of the electronic parts can be electromagnetically shielded from the other part, also in the electromagnetic-shielding body.

Therefore, an electronic member, e.g., a digital board and the like, which is a generation source of electromagnetic noise is disposed separately from another electronic member, e.g., an analog board and the like, which tends to be influenced by electromagnetic noise, through the electromagnetic shielding partition member, in the electromagnetic-shielding body, even if the electronic member which generates electromagnetic noise and the electronic member which tends to be influenced by electromagnetic noise are disposed close to each other, in the electromagnetic-shielding body, the latter electronic member is not influenced by electromagnetic noise.

Even in an extremely small-sized electronic apparatus, e.g., an electronic watch or the like, it is possible to dispose the electronic member which tends to be influenced by electromagnetic noise close to the electronic member which generates high-frequency digital noise.

According to the electronic apparatus in which a switching piece for switching the electronic member is elastically formed in the standing and surrounding periphery of the other of the half body members, a portion of the shielding body can be used also as a switching piece for switching the electronic member, it provides space-saving on design for an electronic apparatus.

According to the electronic apparatus in which the hook is fixed to the recess portion formed on the fixing plate by soldering through the hole formed in the circuit board, it is possible to integrate the body and the circuit board to the apparatus case through the fixing plate, to make the electric potential of the shielding body the same as the circuit board, and to improve the electromagnetic shielding performance.

According to the electronic apparatus in which the positioning portion is provided for positioning the circuit board to the fixing plate on the peripheral portion of the fixing plate, it is possible to prevent the circuit board from getting out of position to the fixing plate and thereby to integrate the fixing plate and the circuit board suitably.

According to the electronic apparatus in which the difference between the heights of the surfaces to be adhered and the pattern electrode line terminals is set small, i.e., not more than 15 $\mu$m, it is possible to make the adhesion area between each adhesive layer and each surface to be adhered large, even if the width between the line terminals 232 is small. As a result, it is possible to connect the conductive layers with the line terminals certainly.

According to the electronic apparatus in which an antenna is arranged outside one of the pair of half body members, and the antenna and the electronic member are electromagnetically shielded mutually by the body, even if an electromagnetic member which is a generation source of electromagnetic noise is included in the body, it is possible to prevent the antenna from reception interruption.

According to the electronic apparatus in which the antenna may be a GPS receiving antenna for receiving a signal from a GPS satellite, and the electronic member may comprise a GPS receiving circuit section for processing the received signal from the GPS receiving antenna, it is possible to receive a signal from the GPS satellite through the GPS receiving antenna, and to process the received signal from the GPS receiving antenna by the electronic member which is the GPS receiving circuit section. As a result, the electronic apparatus has a GPS function.

According to the electronic apparatus which further comprises: a pair of band members which are attached to the peripheral portions opposite to each other, of the apparatus case, for wearing the electronic apparatus around a wrist; a display section which is disposed in the front side of the electronic apparatus, for displaying the data generated by processing signals through the receiving circuit section; an operational section which is disposed at the peripheral portion of the apparatus case, for operating the electronic apparatus; and a battery containing section for containing a battery as a power source, it is possible to use it with wearing on the wrist. It is possible to know the data created by processing signals from the receiving circuit section, e.g., position measurement data (present positioning information) or the like, by means of the display section which is provided in the front side of the apparatus case. Further, various types of operations can be carried out by using the operational sections which are arranged at the periphery of the apparatus case. Because of having the battery containing section for containing a battery as an electric power, it is suitable for portable use.

According to the electronic apparatus in which the GPS receiving antenna is arranged in the left side of the display section, and the operational section is arranged at at least one of the right side portion of the apparatus case, this side of the display section and this side of the GPS receiving antenna, for the user, when the wrist instrument is worn on a left wrist of the user and the operational sections are operated by the right hand, it is possible to prevent the GPS receiving antenna from shielding by the right hand and to prevent the display of the display section from shielding by the hand. Therefore, it is possible to operate the operational sections suitably while not only receiving signals by the GPS receiving antenna but also seeing the display on the display section.

According to the electronic apparatus in which the GPS receiving antenna is arranged in the right side of the display section, when the wrist instrument is worn on a left wrist of the user and even if a portion of the wrist instrument is covered by the sleeve of clothes or the like, there is a little possibility of covering the GPS receiving antenna by the sleeve of clothes or the like. As a result, it is possible to carry out reception by the GPS receiving antenna suitably.

In the case that the GPS receiving antenna is arranged at the right side of the display section for the user, and the operational sections are arranged at at least one of the right side portion of the apparatus case, this side of the display section and this side of the GPS receiving antenna, for the user, when the operational sections are operated by the right hand, it is possible to prevent the GPS receiving antenna from shielding by the right hand.

In the case that the GPS receiving antenna is arranged in the other side of the display section, and the operational section is arranged at at least one of the right side portion of the apparatus case, this side of the display section, and this side of the GPS receiving antenna, when the operational sections are operated by the right hand, it is possible to prevent the GPS receiving antenna from shielding by the right hand.

According to the electronic apparatus in which two of the GPS receiving antenna, the display section and the battery containing portion may be arranged in a direction approximately perpendicular to the band direction, and the remaining one is arranged in the other side for a user; and the battery containing portion is arranged in the apparatus case, all of the GPS receiving antenna, the display section and the battery containing portion are not arranged on a linear line in the apparatus case. Accordingly, the size in a direction, of the electronic apparatus is not large.

What is claimed is:

1. A wrist instrument adapted to be worn on a wrist of a user, said wrist instrument comprising:

an instrument body;

a display section disposed on the instrument body;

at least one operational section disposed on the instrument body; and a data receiving section disposed on the instrument body;

wherein the instrument body comprises:

a body comprising a pair of box-shaped half body members made of electromagnetic shielding material, each half body member comprising a plate and a standing and surrounding frame formed integrally at a periphery of the plate and each half body member having an opening at an end thereof, and said pair of half body members being coupled to each other with the openings thereof facing each other by fitting the surrounding frame of one of the half body members into the surrounding frame of the other one of the half body members;

a pair of electronic members which are capable of processing a received signal and which are disposed at upper and lower positions in the body; and an electromagnetic shielding partition member which is disposed in the body to partition the pair of electronic members.

2. The wrist instrument as claimed in claim 1, wherein at least one elastically deformable switching piece adapted to effect an electronic switching operation with respect to at least one of the pair of electronic members is formed in the standing and surrounding frame of at least one of the pair of half body members.

3. The wrist instrument as claimed in claim 1, wherein the instrument body comprises:

time measurement means for measuring time;

data processing means for processing data received by the data receiving section; and a display control section which controls the display section to display at least one of the time measured by the time measurement means and the data processed by the data processing means.

4. The wrist instrument as claimed in claim 1, wherein said wrist instrument comprises a band adapted to be fitted to a wrist of a user, and the data receiving section comprises a position information receiving antenna which receives position information, and wherein said position information receiving antenna is disposed at a position in an attachment direction of the band, or at a position in a direction perpendicular to the attachment direction of the band and passing through the display section.

5. The wrist instrument as claimed in claim 1, wherein said wrist instrument comprises a band adapted to be fitted to a wrist of a user, and a battery containing section is disposed on the band.

6. The wrist instrument as claimed in claim 1, wherein a display face of the display section is inclined at an angle to a receiving face of the data receiving section so that the display face is visible to a user when the receiving face is horizontal.

7. The wrist instrument as claimed in claim 1, wherein the instrument body comprises:

an inclination detecting section which detects an angle of inclination of the instrument body in a predetermined range; and a reception processing section which starts a reception processing of the data receiving section when the angle of inclination of the instrument body is detected to be in the predetermined range.

8. The wrist instrument as claimed in claim 1, wherein the instrument body comprises a light luminescent section which emits light to illuminate the display section.

9. The wrist instrument as claimed in claim 1, wherein a rear surface of the instrument body is curved.

10. The wrist instrument as claimed in claim 1, wherein the instrument body comprises a watch section which displays time.

11. The wrist instrument as claimed in claim 1, wherein:

at least one of the electronic members is provided on a circuit board which is disposed between one of the half body members and a fixing plate; and the half body member body is coupled to the fixing plate by passing a hook provided on the half body member through a hole formed in the circuit board and by soldering the hook to a recess portion formed on the fixing plate.

12. The wrist instrument as claimed in claim 11, wherein a positioning portion is provided on the fixing plate to position the circuit board on a peripheral portion of the fixing plate.

13. The wrist instrument as claimed in claim 11, further comprising a flexible heat seal which includes a connecting portion which electrically connects the circuit board with another electronic member, and wherein:

the circuit board comprises a plurality of pattern electrode line terminals, surfaces to be adhered which are formed around the pattern electrode line terminals, and a terminal portion to be connected with the connecting portion;

the connecting portion of the heat seal comprises conductive layers which are formed to correspond to the pattern electrode line terminals and be equal in number to the pattern electrode line terminals, and adhesive layers which are formed around the conductive layers and adhered to the surfaces to be adhered by pressing the connecting portion against the terminal portion to connect the connecting portion with the terminal portion and to electrically connect the conductive layers with the corresponding pattern electrode line terminals; and a difference between heights of the surfaces to be adhered and the pattern electrode line terminals is not more than 15 µm.

14. The wrist instrument as claimed in claim 1, wherein an antenna is arranged outside one of the pair of half body members, and the antenna and at least one of the electronic members are electromagnetically shielded mutually by the instrument body.

15. The wrist instrument as claimed in claim 14, wherein the antenna comprises a GPS receiving antenna which receives a signal from a GPS satellite, and one of the electronic members comprises a GPS receiving circuit section which processes the received signal from the GPS receiving antenna.

16. The wrist instrument as claimed in claim 15, further comprising a battery containing section adapted to hold a battery as a power source, and a pair of band members which are attached to opposite peripheral portions of an apparatus case of the wrist instrument and which are adapted to enable the wrist instrument to be worn on a wrist of a user, and wherein:

the display section is disposed on a front side of the apparatus case to display data generated by processing signals through the data receiving section; and the operational section is disposed at a peripheral portion of the apparatus case to enable the wrist instrument to be operated.

17. The wrist instrument as claimed in claim 16, wherein:

the GPS receiving antenna is arranged on one of a top side, left side and right side of the display section; and the operational section is arranged on one of the right side and bottom side of the display section, or a bottom side of the GPS receiving antenna.

18. The wrist instrument as claimed in claim 17, wherein:

a given two of the GPS receiving antenna, the display section and the battery containing portion are arranged in a direction approximately perpendicular to the band members, and a remaining one of the GPS receiving antenna, the display section and the battery containing portion is arranged on another side for a user; and the battery containing portion is disposed in the apparatus case of the wrist instrument.

* * * * *